United States Patent
Barman et al.

(10) Patent No.: US 9,171,224 B2
(45) Date of Patent: Oct. 27, 2015

(54) METHOD OF IMPROVING CONTRAST FOR TEXT EXTRACTION AND RECOGNITION APPLICATIONS

(71) Applicant: QUALCOMM Incorporated, San Diego, CA (US)

(72) Inventors: Kishor K. Barman, Guwahati (IN); Hemanth P. Acharya, Bangalore (IN); Pawan Kumar Baheti, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/023,306

(22) Filed: Sep. 10, 2013

(65) Prior Publication Data
US 2015/0010233 A1    Jan. 8, 2015

(30) Foreign Application Priority Data
Jul. 4, 2013    (IN) .......................... 2983/CHE/2013

(51) Int. Cl.
| *G06K 9/00* | (2006.01) |
| *G06K 9/34* | (2006.01) |
| *G06K 7/10* | (2006.01) |
| *G06K 9/36* | (2006.01) |

(52) U.S. Cl.
CPC ....................................... *G06K 9/36* (2013.01)

(58) Field of Classification Search
None
See application file for complete search history.

(56) References Cited

U.S. PATENT DOCUMENTS

| 6,301,386 | B1 * | 10/2001 | Zhu et al. ....................... 382/176 |
| 7,313,275 | B2 * | 12/2007 | Lee et al. ....................... 382/176 |
| 7,555,161 | B2 * | 6/2009 | Haddon et al. ................ 382/173 |
| 7,813,554 | B2 * | 10/2010 | Wang et al. .................... 382/199 |
| 7,817,855 | B2 | 10/2010 | Yuille et al. |
| 7,929,765 | B2 * | 4/2011 | Sun et al. ....................... 382/182 |
| 8,320,674 | B2 * | 11/2012 | Guillou et al. ................ 382/179 |
| 8,712,925 | B2 * | 4/2014 | Clark et al. .................... 705/400 |
| 2004/0258285 | A1 | 12/2004 | Hansen |
| 2009/0074249 | A1 | 3/2009 | Moed |
| 2009/0196501 | A1 * | 8/2009 | Ma ................................. 382/169 |

(Continued)

OTHER PUBLICATIONS

Jung, Dz-Mou, and George Nagy. "Joint feature and classifier design for OCR." Document Analysis and Recognition, 1995., Proceedings of the Third International Conference on. vol. 2. IEEE, 1995.*

(Continued)

*Primary Examiner* — Andrae S Allison
(74) *Attorney, Agent, or Firm* — Silicon Valley Patent Group LLP

(57) ABSTRACT

An electronic device and method receive (for example, from a memory), a grayscale image of a scene of real world captured by a camera of a mobile device. The electronic device and method also receive a color image from which the grayscale image is generated, wherein each color pixel is stored as a tuple of multiple components. The electronic device and method determine a new intensity for at least one grayscale pixel in the grayscale image, based on at least one component of a tuple of a color pixel located in correspondence to the at least one grayscale pixel. The determination may be done conditionally, by checking whether a local variance of intensities is below a predetermined threshold in a subset of grayscale pixels located adjacent to the at least one grayscale pixel, and selecting the component to provide most local variance of intensities.

24 Claims, 11 Drawing Sheets

(56) References Cited

U.S. PATENT DOCUMENTS

2012/0213429 A1*  8/2012  Vasudevan et al. ........... 382/162
2013/0011055 A1*  1/2013  You et al. ..................... 382/165

OTHER PUBLICATIONS

Jung, D.-M.; Krishnamoorthy, M.S.; Nagy, G.; Shapira, A., "N-tuple features for OCR revisited," Pattern Analysis and Machine Intelligence, IEEE Transactions on, vol. 18, No. 7, pp. 734,745, Jul. 1996.*
Tyade et al Text Recognition and Translation Application for Smartphone, International Journal of Advanced Research in Computer and Communication Engineering vol. 2, Issue 6, Nov. 2013.*
Strouthopoulos et al. "Text extraction in complex color documents", Pattern Recognition 35 (2002), pp. 1743-1758.
Chen, et al. "Detecting and reading text in natural scenes," IEEE Computer Society Conference on Computer Vision and Pattern Recognition (CVPR'04), 2004, pp. 1-8.
Jain, et al. "Automatic text location in images and video frames", Pattern Recognition, 1998, pp. 2055-2076, vol. 31, No. 12.
Epshtein, et al. "Detecting text in natural scenes with stroke width transform," Computer Vision and Pattern Recognition (CVPR) 2010, pp. 2963-2970, (as downloaded from "http://research.microsoft.com/pubs/149305/1509.pdf").
Dr. Andrew Greensted, "Otsu Thresholding", at the Lab Book Pages, http://www.labbookpages.co.uk/software/imgProc/otsuThreshold.html published Jun. 17, 2010, pp. 1-4.
Matas, et al. "Robust Wide Baseline Stereo from Maximally Stable Extremal Regions" Proc. of British Machine Vision Conference, pp. 384-396, published 2002.
Nister, et al. "Linear Time Maximally Stable Extremal Regions", ECCV, 2008, Part II, LNCS 5303, pp. 183-196, published by Springer-Verlag Berlin Heidelberg.
Chen et al. "Robust Text Detection in Natural Images With Edge-Enhanced Maximally Stable Extremal Regions", IEEE International Conference on Image Processing (ICIP), Sep. 2011, pp. 1-4.
Matteo Pardo and Giorgio Sberveglieri, "Learning From Data: A Tutorial With Emphasis on Modern Pattern Recognition Methods," IEEE Sensors Journal, vol. 2, No. 3, Jun. 2002, pp. 203-217.
Lasse Holmstrom, Petri Koistinen, Jorma Laaksonen and Erkki Oja, "Neural and Statistical Classifiers—Taxonomy and Two Case Studies," IEEE Transactions on Neural Networks, vol. 8, No. 1, Jan. 1997, pp. 5-16.
Machine learning, retrieved from http://en.wikipedia.org/wiki/Machine_learning, May 7, 2012, pp. 1-8.
Chiddarwar A.S., et al., "Contrast Based Enhancement of Palm-leaf Manuscript Images," 2010 Second International Conference on Computer Engineering and Applications, IEEE, 2010, pp. 219-223.
Kiragu H., et al., "An Improved Enhancement of Degraded Binary Text Document Images Using Morphological and Single Scale Retinex Operations," IET Conference on Image Processing (IPR 2012), Jul. 2012, pp. 1-6.
Lin L., et al., "Text Extraction from Name Cards with Complex Design," Proceedings of the 2005 Eight International Conference on Document Analysis and Recognition (ICDAR'05), 2005, 4 Pages.
Neumann L., et al., "Real-Time Scene Text Localization and Recognition," IEEE, 2012, pp. 3538-3545.
Feng M-L., et al., "Adaptive Binarization Method for Document Image Analysis," 2004 IEEE International Conference on Multimedia and Expo (ICME), 2004, pp. 339-342.
Grundland et al., "Decolorize: Fast, contrast enhancing, color to grayscale conversion", Pattern Recognition, Elsevier, GB, vol. 40, No. 11, Jul. 16, 2007, pp. 2891-2896, XP022155447, ISSN: 0031-3203, DOI: 10.1016/J.PATCOG.2006.11.003.
International Search Report and Written Opinion—PCT/US2014/041521—ISA/EPO—Nov. 3, 2014.
Forssen, P.-E., "Maximally Stable Colour Regions for Recognition and Matching," 2007 IEEE Conference on Computer Vision and Pattern Recognition (CVPR '07), Minneapolis, MN, Jun. 17-22, 2007, 8 pages.
Otsu, N., "A Threshold Selection Method from Gray-Level Histograms," IEEE Transactions on Systems, Man, and Cybernetics, vol. SMC-9, No. 1, Jan. 1979, pp. 62-66.

* cited by examiner

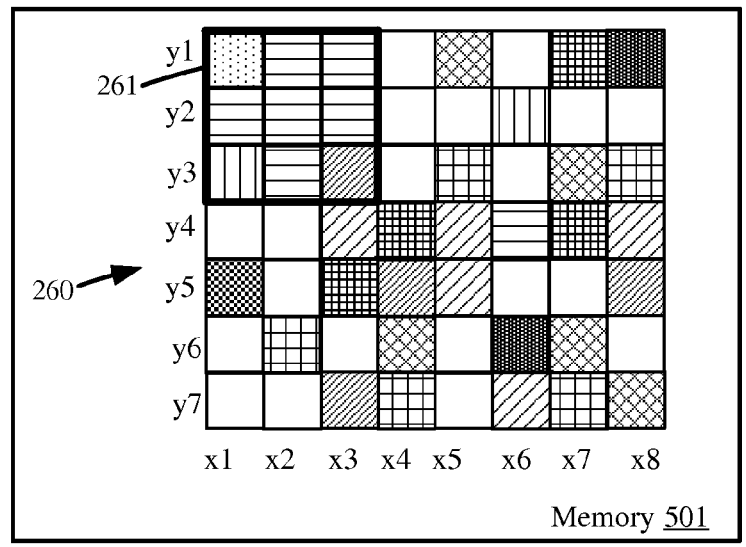
FIG. 2B
FIG. 2C
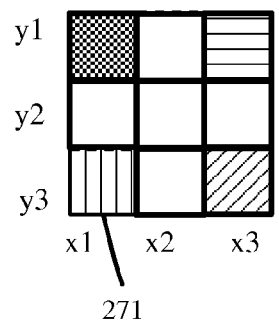
FIG. 2D
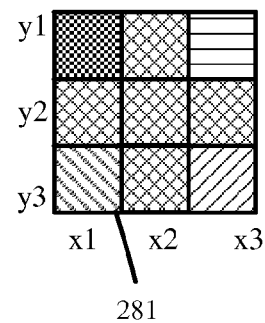
FIG. 2E
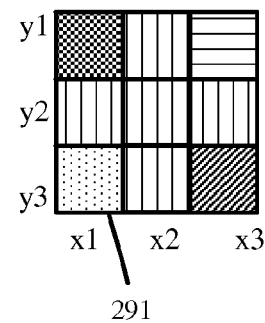
FIG. 2F
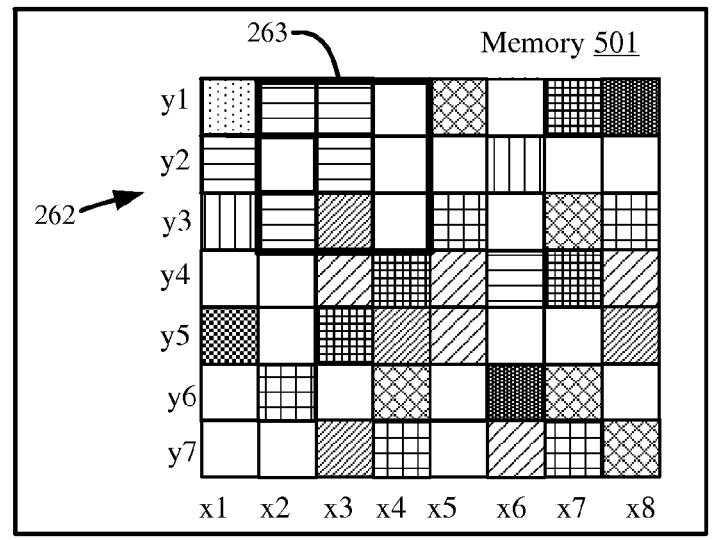

METHOD OF IMPROVING CONTRAST FOR TEXT EXTRACTION AND RECOGNITION APPLICATIONS

CROSS-REFERENCE TO PRIORITY APPLICATION FILED IN INDIA

This patent application claims priority from Indian Application No. 2983/CHE/2013 filed in The Office of the Controller General of Patents, Designs & Trade Marks (also known as the Intellectual Property Office) in India on Jul. 4, 2013, which is hereby incorporated by reference herein in its entirety.

FIELD

This patent application relates to devices and methods for increasing contrast in natural images or video frames, for use in extracting therefrom words of text.

BACKGROUND

Identification of text regions in papers that are optically scanned (e.g. by a flatbed scanner of a photocopier) is significantly easier (e.g. due to upright orientation, large size and slow speed) than detecting regions that may contain text in scenes of the real world that may be captured in images (also called "natural images") or in video frames in real time by a handheld device (such as a smartphone) having a built-in digital camera. Specifically, optical character recognition (OCR) methods of the prior art originate in the field of document processing, wherein the document image contains regions that are black or white or several shades of gray.

Document processing techniques, although successfully used on scanned documents created by optical scanners, generate too many false positives and/or negatives so as to be impractical when used on natural images. For example, FIG. 1A illustrates a bill board 100 in a real world scene in India. A user 110 (see FIG. 1A) may use a camera-equipped mobile device 108 (such as a cellular phone) to capture an image 107 (also called "natural image" or "real world image") of the bill board 100. Camera captured image 107 may be displayed on a screen 106 of mobile device 108. Such an image 107 (FIG. 1A) is normally captured in three colors, such as Red (FIG. 1B), Green (FIG. 1C) and Blue (FIG. 1D), and converted into a grayscale image (FIG. 1E).

When a grayscale image (FIG. 1E) is processed in the normal manner, prior art image processing techniques may result in failure to recognize one or more words. This is because many prior art techniques generate too many false positives and/or negatives so as to be impractical when used on images containing natural features (such as branches of a tree) mixed with text (e.g. in various colors) e.g. on bill boards, traffic signs, store fronts, vehicle license plates, etc. due to variations in lighting, color, tilt, focus, font, etc.

For information on techniques used in the prior art, to identify text regions in color images, see the following articles incorporated by reference herein in their entirety as background:

(a) STROUTHOPOULOS et al, "Text extraction in complex color documents", Pattern Recognition 35 (2002) 1743-1758;
(b) CHEN, et al. "Detecting and reading text in natural scenes," IEEE Computer Society Conference on Computer Vision and Pattern Recognition (CVPR'04), 2004, pages 1-8;
(c) JAIN, et al. "Automatic text location in images and video frames", Pattern Recognition, 1998, pp. 2055-2076, Vol. 31, No. 12; and
(d) EPSHTEIN, et al. "Detecting text in natural scenes with stroke width transform," Computer Vision and Pattern Recognition (CVPR) 2010, pages 2963-2970, (as downloaded from "http://research.microsoft.com/pubs/149305/1509.pdf").

Image processing techniques of the type described in such prior art articles appear to be developed under an assumption that text regions have adequate contrast relative to background regions in a grayscale image. Accordingly, use of such techniques on images that do not conform to such an assumption can result in false positives and/or negatives, which thereby render such techniques impractical. Hence, there is a need to improve contrast of a natural image or video frame, for use in text extraction and recognition applications as described below.

SUMMARY

In several aspects of described embodiments, an electronic device and method receive (for example, from a memory), a color image of a scene of real world captured by a camera of a mobile device. The electronic device and method also receive a grayscale image (also called "original" grayscale image), which is generated from the color image. The electronic device and method check whether groups of grayscale pixels in the grayscale image meet a test for low contrast, each group being selected based on a current grayscale pixel, and grayscale pixels adjacent thereto. When the test for low contrast is met by a group of grayscale pixels, electronic device and method use at least one component in a tuple of a color pixel in the color image, to determine a new intensity which is to replace an existing intensity of the current grayscale pixel in the original grayscale image. When the test for low contrast is not met by a group, the existing intensity of the current grayscale pixel is retained unchanged.

The electronic device and method repeat the above-described acts of checking, and determining new intensity or retaining existing intensity multiple times, by selecting as the current pixel, several pixels in the original grayscale image (e.g. by visiting all pixels or less than all pixels, depending on the embodiment), thereby to generate and store in a memory, a new grayscale image. Thus, the new grayscale image is a composite, formed by combination of (a) new intensities for certain grayscale pixels, and (b) existing intensities for remaining grayscale pixels. The new grayscale image is then used normally, e.g. binarized followed by optical character recognition (OCR).

In some embodiments, the above-described test for low contrast is performed by computing as a measure of contrast, variance in intensities in the group of grayscale pixels, followed by comparison of variance against a predetermined limit. Instead of variance, the above-described test may use any other measure of contrast (e.g. standard deviation) and/or in combination with any characteristic(s) of the tuple of color pixels.

In certain embodiments, a tuple of a color pixel has N color channels, e.g. 3 color channels such as Red, Green, and Blue. In such embodiments, a specific color channel is automatically selected, by use of the measure of contrast to identify whichever color channel has highest contrast. An intensity of the identified color channel is then used as the new intensity, or used to compute the new intensity using a predetermined formula.

In several embodiments, a region of a new grayscale image is binarized and subject to Optical Character Recognition (OCR), followed by a word decoder that indicates a confidence in a word. When the confidence of the word decoder falls below a limit, a histogram of intensities of the composite of grayscale pixels is checked for occurrence of a peak, in a range of intensities predetermined for being likely to represent text pixels. When a peak is not found in the range, a rectangular block including the region is binarized again, using a threshold identified by using the histogram, followed by OCR.

It is to be understood that several other aspects of the invention will become readily apparent to those skilled in the art from the description herein, wherein it is shown and described various aspects by way of illustration. The drawings and detailed description below are to be regarded as illustrative in nature and not as restrictive.

BRIEF DESCRIPTION OF THE DRAWINGS

FIG. 2B illustrates a memory 501 of a mobile device 601 of some embodiments wherein a measure of contrast of a group 261 of grayscale pixels in image 260 is used to selectively replace an existing intensity of a current pixel at location (x2, y2) with a new intensity, depending on contrast measures of correspondingly located groups of pixels 271, 281 and 291 in three color channels captured by mobile device 601, described next.

FIGS. 2C, 2D and 2E illustrate three groups 271, 281 and 291 of pixels in the three colors Red, Green and Blue respectively, which are used by mobile device 601 to compute a new intensity for the current pixel at location (x2, y2) in FIG. 2B.

FIG. 2F illustrates in memory 501 a new grayscale image 262 formed by performing act 214 of FIG. 2A, as a composite of existing intensities of grayscale pixels at all locations except location (x2, y2) at which is stored an intensity of red color of a current pixel at location (x2, y2) in the group 271 of red color pixels of FIG. 2C (with group 271 selected for having highest contrast, among the groups 271, 281 and 291).

DETAILED DESCRIPTION

Figure 1A:
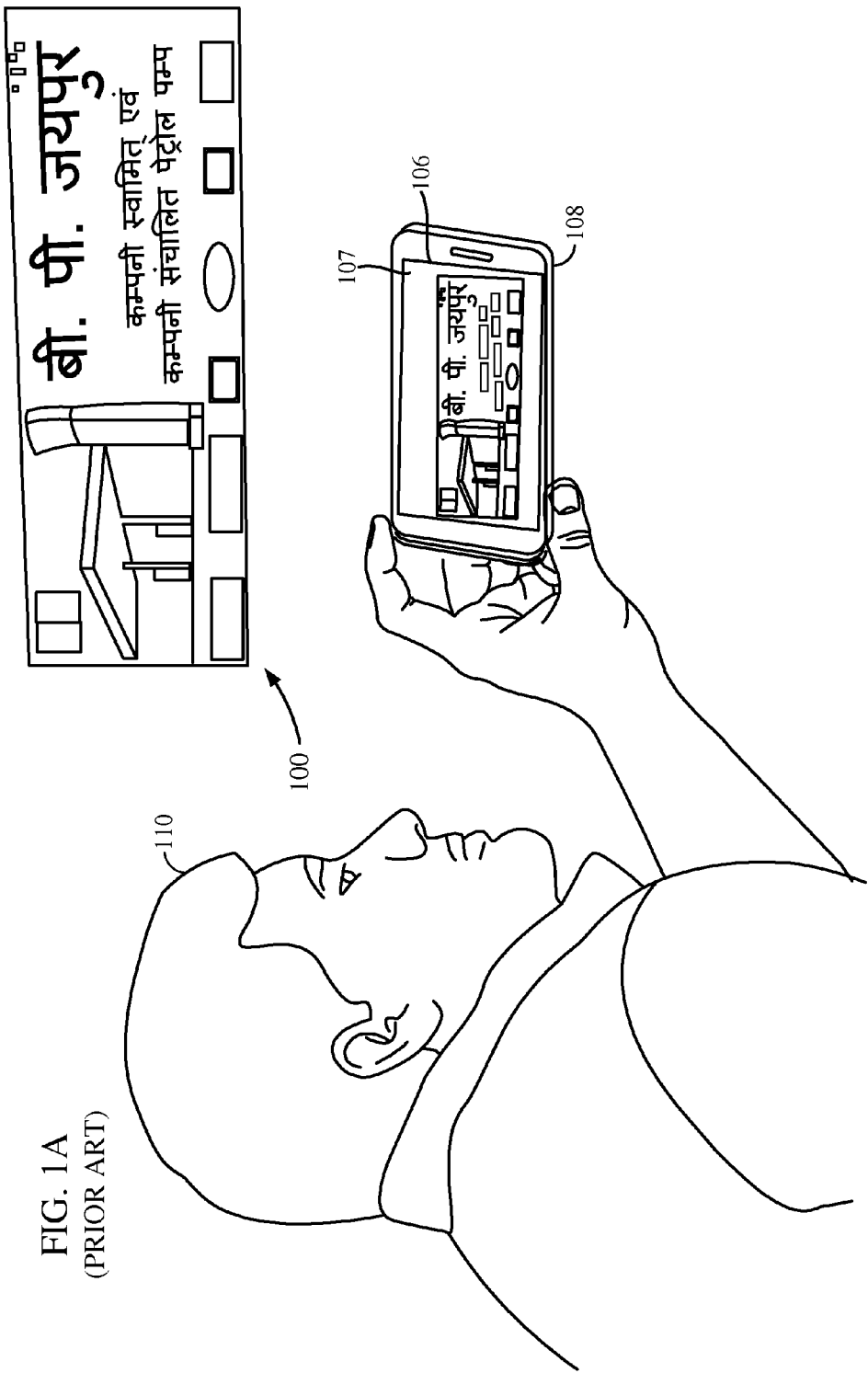
FIG. 1A illustrates a user using a camera-equipped mobile device of the prior art to capture an image 107 of a bill-board in the real world.
Figure 1B:
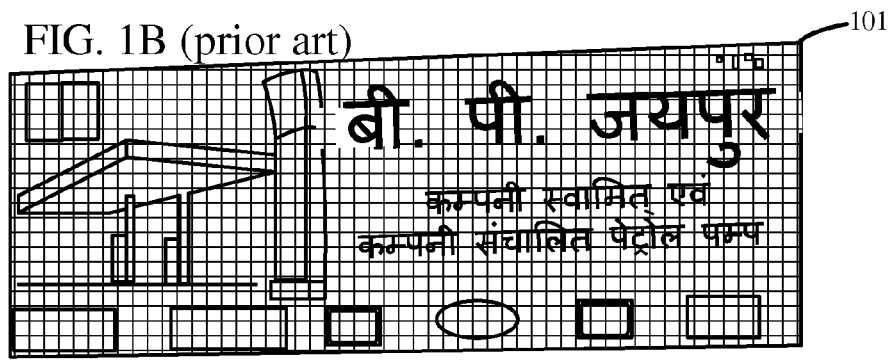
FIGS. 1B, 1C and 1D illustrate three monochrome images 101, 102 and 103 in the three colors Red, Green and Blue respectively, which are captured in three color channels by the mobile device 108 of FIG. 1A.
Figure 1C:
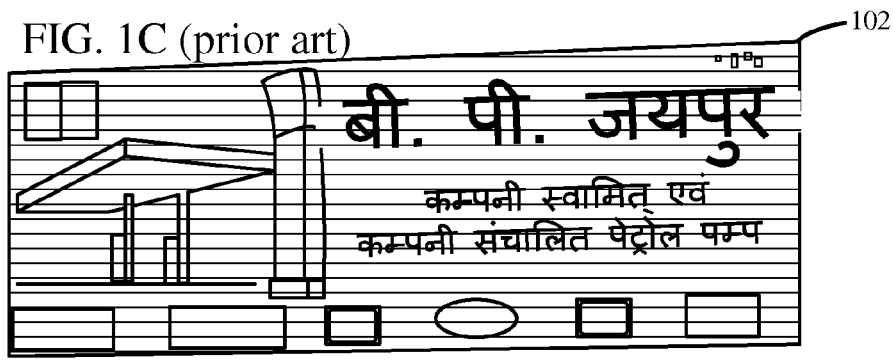
Figure 1D:
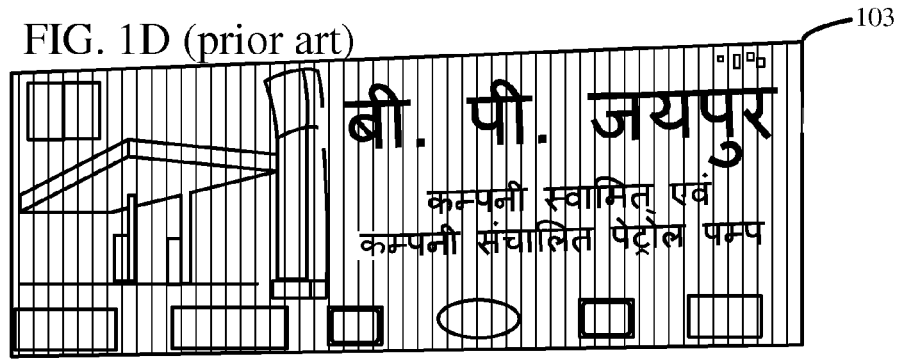
Figure 1E:
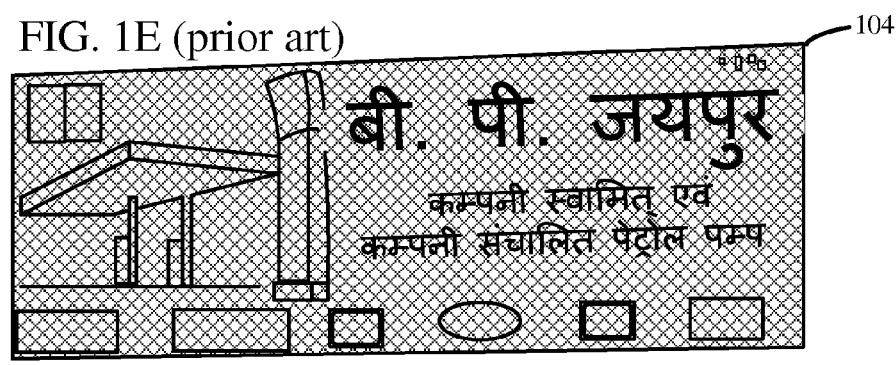
FIG. 1E illustrates a grayscale image 104 normally generated for use in OCR, from the three images 101, 102 and 103 illustrated in FIGS. 1B, 1C and 1D.
Figure 6:
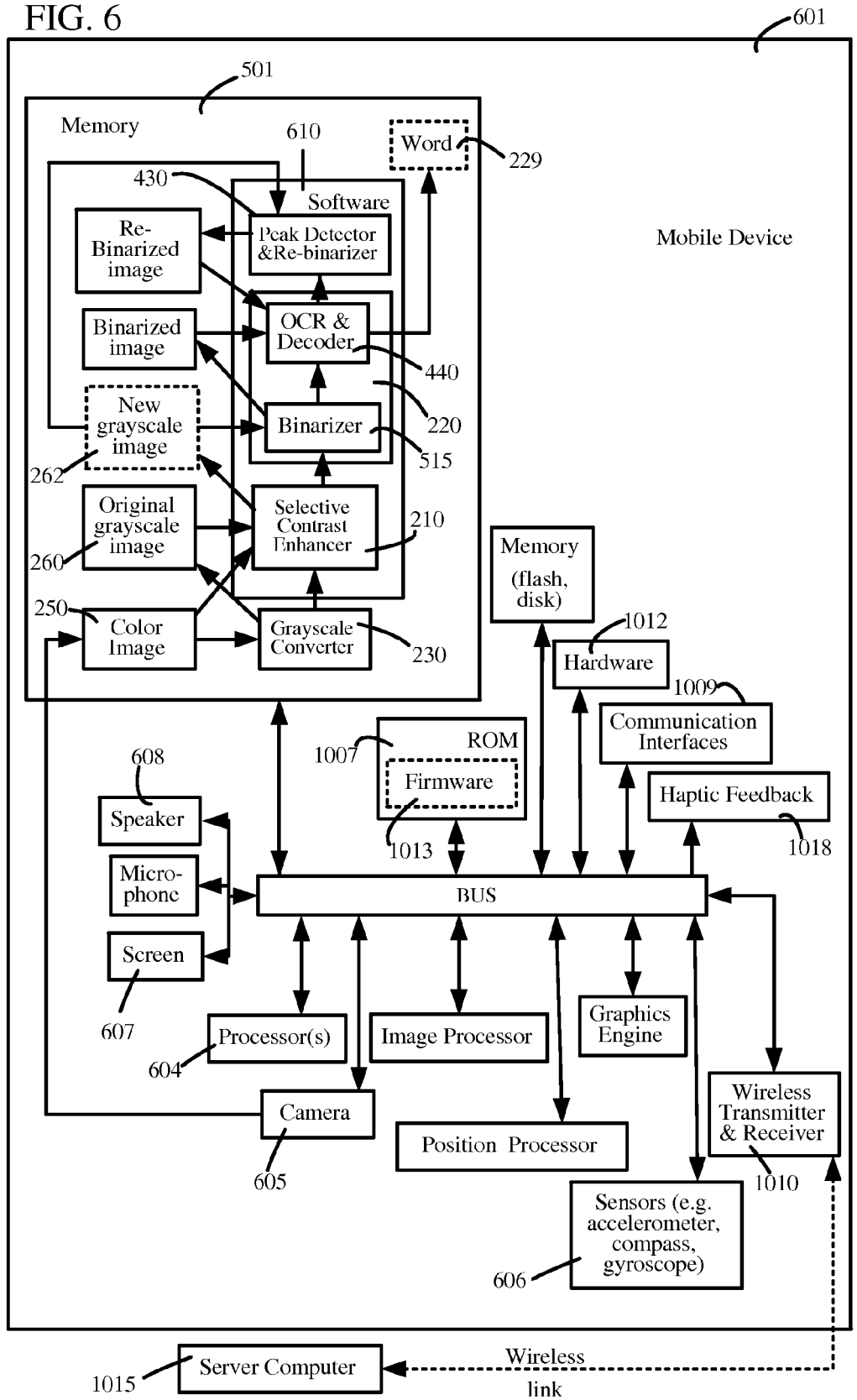
FIG. 6 illustrates, in a high-level block diagram, various components of a mobile device 601 in some of the described embodiments.

In several aspects of described embodiments, a processor 604 in mobile device 601 performs an act 201 (FIG. 2A) to receive (for example, from a memory 501), a color image 250 (FIG. 6) or video frame in a stream of video frames of a scene of real world, which may be captured by a camera 605 in mobile device 601. Color image 250 or video frame received by processor 604 in act 201 may be represented, for example, as three monochrome images (similar or identical to images 101, 102, 103 illustrated in FIGS. 1B, 1C and 1D) with intensities of the three colors Red, Green and Blue respectively. Processor 604 also receives, in act 202 (FIG. 2A) a grayscale image (also called "original" grayscale image) 260 illustrated in FIG. 6 that is generated from the color image 250 or video frame, e.g. by a grayscale converter 230 (FIG. 6).

Grayscale converter 230 generates an intensity Igray of each pixel (also called grayscale pixel) in original grayscale image 260 stored in memory 501 in the normal manner, for example, as a weighted sum of intensities Ired, Igreen and Iblue of three colors Red, Green and Blue of a correspondingly located color pixel in the color image 250. Specifically, intensities Ired, Igreen and Iblue at each location (x, y) at the top-left corner in each of groups 271, 281 and 291 of color pixels in FIGS. 2C, 2D and 2E may be averaged by grayscale converter 230 (FIG. 6) to obtain an intensity Igray of a grayscale pixel at the corresponding location (x, y) for the original grayscale image 260 of FIG. 2B. Each intensity Igray at a location (x,y) of the original grayscale image 260 is also referred to herein as an existing grayscale intensity, old Igray.

In several embodiments, the intensity of each grayscale pixel old Igray in the original grayscale image 260 (FIG. 6) generated by grayscale converter 230 is stored in memory 501 in binary form, e.g. 8 bits per pixel, to represent 256 different shades of gray. In some embodiments that use a color model in which a color image 250 constitutes N monochromatic images, each monochromatic image of a specific color may be stored in memory 501 (on receipt from camera 605 in FIG. 6) in an identical format, e.g. 8 bits per pixel, to represent 256 different levels of the specific color, e.g. Red, Green or Blue. Although colors Red, Green and Blue are used to describe a color image 250 received in act 201 from memory 501, any other color model may be used as described herein, e.g. a color model based on cyan, magenta, yellow, and black (CMYK) may be used, depending on the embodiment.

Several embodiments of processor 604 store a color image 250 or video frame in memory 501 as a tuple of N components, for each location (x, y) of a pixel in the color image. So, in embodiments that use an RGB color model, the tuple has three intensities, namely Ired, Igreen and Iblue, which form three components of the tuple, wherein N=3. As will be apparent in view of this detailed description, other embodiments use N tuples with more components, or fewer components, or different components. For example, certain embodiments based on the CMYK color model use a tuple having four components, wherein N=4. Other embodiments use a tuple of three components but each component in the tuple does not represent a color, and instead colors are indicated in one component, and intensity in another component, e.g. based on a HSB color model with Hue, Saturation, and Brightness as the three components of a tuple. Note that the HSB model is also known in the art as a HSV model (wherein V denotes value of brightness). Still other embodiments may use a tuple of three components formed of, for example, Tint, Saturation and Luminance, based on a TSL model.

Regardless of which color model is used in a tuple at an (x,y) location in a color image 250 or video frame received in act 201, a grayscale image 260 that is received in act 202 (FIG. 2A) has been already generated from that color image 250 or video frame. Accordingly, processor 604 in mobile device 601 of several embodiments described herein uses a color image 250 or video frame and a grayscale image 260 generated therefrom as inputs, to perform a method by executing computer instructions in software 610 (FIG. 6) stored in memory 501. In several such embodiments, execution of at least some of the computer instructions in software 610 causes processor 604 to operate as a selective contrast enhancer 210. During operation as selective contrast enhancer 210, processor 604 automatically determines a new intensity for a grayscale pixel (also called "current grayscale pixel") in grayscale image 260 based on intensities in a color pixel in color image 250, when a test is met indicative of low contrast at the current grayscale pixel (also called "first test").

Specifically, selective contrast enhancer 210 of some embodiments performs acts 211-216 illustrated in FIG. 2A as follows. In act 211, processor 604 in mobile device 601 selects a pixel in grayscale image 260 to be the current grayscale pixel. For example, a pixel at location (x2, y2) grayscale image 260 (FIG. 2B) may be selected in act 211 as the current grayscale pixel. In selecting the current pixel in act 211, processor 604 of some embodiments makes the selection independent of whether the pixel belongs to a region that is a connected component in grayscale image 260, although in other embodiments only pixels included in a connected component are selected in act 211. Furthermore, in some embodiments, the selection in act 211 is made independent of whether the pixel being selected happens to be text or non-text.

Several embodiments of act 211 are performed on pixels in a rectangular block that surrounds a region, which region is selected (as described herein) for being a maximally stable extremal region (MSER) and for satisfying a test for presence of text, whereby the pixels subject to act 211 are of two types: text pixels which are pixels within the region, and non-text pixels which are pixels outside the region but within a rectangular block that surrounds the region. A rectangular block surrounding one or more region(s) may be selected automatically in some embodiments, e.g. to have boundaries passing through maximum and minimum x and y coordinates of the region(s). Thus, in line 111 illustrated in red monochrome image 101 of bill board 100 in FIG. 3B, a first rectangular block (not shown) is formed to have its left side passing through the left-most text pixel in "बी" and its right side passing through the right-most text pixel in the period. Similarly, a second rectangular block is formed with boundaries passing through the left-most text pixel in "पी" and the right-most text pixel in the period.

Subsequently, in act 212, processor 604 checks whether a group of grayscale pixels in the grayscale image 260 (e.g. see group 261 in FIG. 2B) meet the predetermined test for low contrast. In act 212, a group of grayscale pixels is automatically selected in some embodiments, e.g. to include the current grayscale pixel and additional grayscale pixels that at least partially surround the current grayscale pixel. For example, group 261 includes grayscale pixels in a 3×3 block centered at the current grayscale pixel, at location (x2, y2). Specifically, group 261 includes eight grayscale pixels that surround current grayscale pixel at location (x2, y2). As will be readily apparent in view of this detailed description, a group can be used in act 212 by including grayscale pixels in a window of any predetermined size centered at the current grayscale pixel at location (x2, y2), depending on the specific embodiment.

Figure 2A:
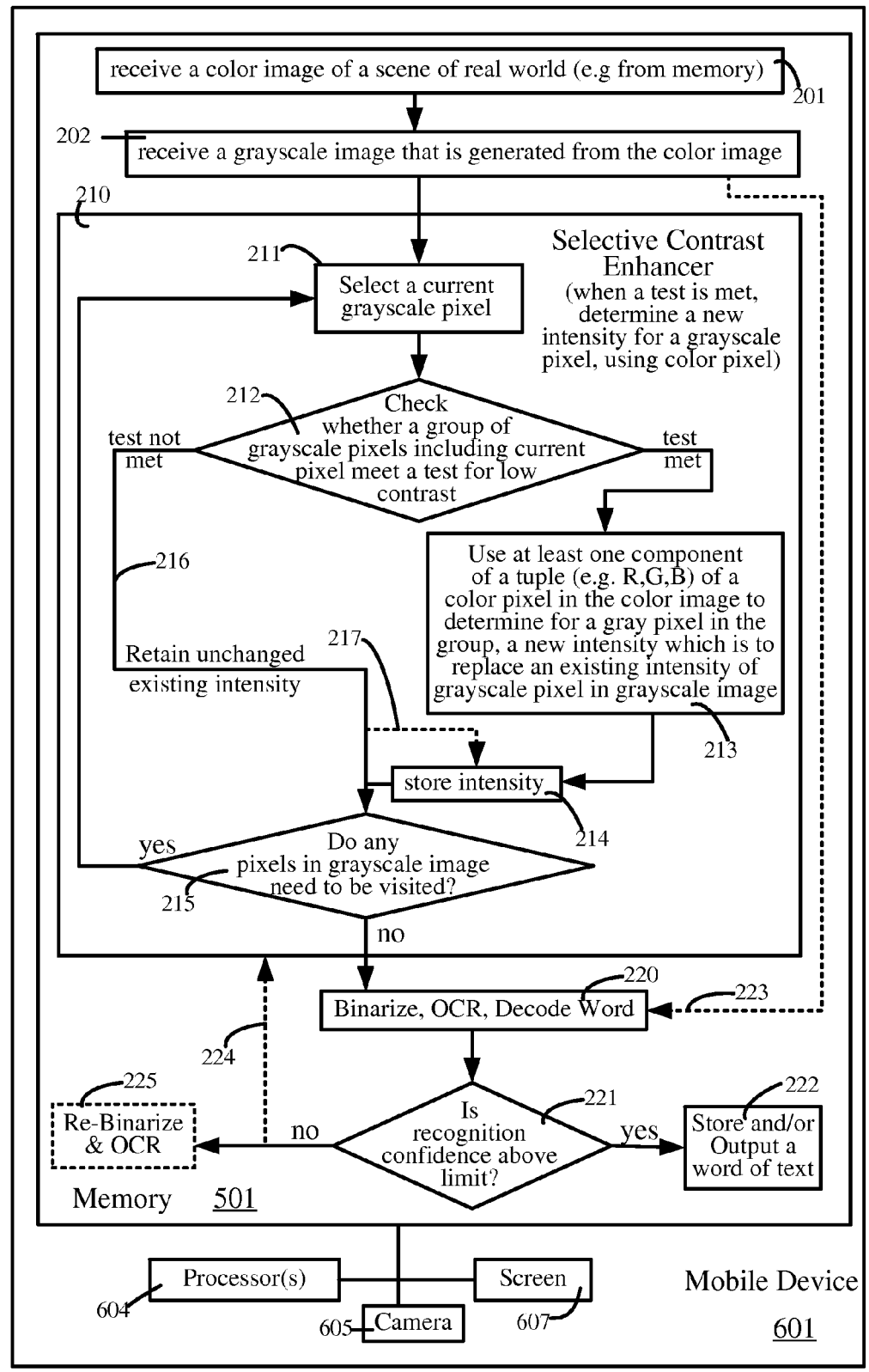
FIG. 2A illustrates, in a high-level flow chart, acts performed by one or more processors 604 in mobile device 601 of some embodiments, to improve contrast in a natural image (or video frame), prior to extraction of a region of text therefrom, for use in OCR.

When processor 604 finds in act 212 that the predetermined test for low contrast is met by a group of grayscale pixels, processor 604 performs an act 213 (FIG. 2A). In act 213, some embodiments of processor 604 use one or more components (also called "tuple components") in a tuple of a color pixel in color image 250 or video frame (FIG. 6) to determine a new intensity new Igray which is to replace an existing intensity old Igray of the current grayscale pixel in original grayscale image 260 (FIG. 6). In several such embodiments, a color pixel whose tuple is used in act 213 is located in color image 250 in correspondence to the current grayscale pixel, e.g. the color pixel at location (x2, y2) in color image 250 is used in act 213 when the current grayscale pixel is at location (x2, y2) in grayscale image 260.

Referring to FIG. 2A, when processor 604 finds in act 212 that the predetermined test for low contrast is not met, processor 604 takes the "no" branch 216 out of act 212, and an existing intensity old Igray of the current grayscale pixel is retained unchanged, i.e. new Igray=old Igray. In certain embodiments, a new grayscale image 262 (FIG. 2F) is generated separate from the original grayscale image 260 (FIG. 2B) by writing the new intensity for each pixel into memory 501. In other embodiments that have constraints on memory, the original grayscale image 260 (FIG. 6) is simply overwritten in memory 501, e.g. by replacing old Igray with the new Igray when the test for low contrast is met while keeping old Igray unchanged when the test is not met, thereby to obtain a new grayscale image 262, in the same memory locations as the existing grayscale image 260.

In certain embodiments wherein new grayscale image 262 is stored in memory locations different from original grayscale image 260 (FIG. 6), branch 216 is followed by act 214 (via branch 217 as shown in FIG. 2A), wherein the existing intensity is stored in memory 501. In such embodiments, act 214 is additionally performed after act 213, and hence a new grayscale image 262 is formed as a combination of (a) new intensities for grayscale pixels stored in act 214 after act 213, and (b) existing intensities of grayscale pixels stored in act 214 via branches 216 and 217. In other embodiments, wherein the new grayscale image is generated by overwriting original grayscale image 260 in memory 501 (FIG. 6), branch 216 goes directly to act 215 as shown in FIG. 2A. In such embodiments, act 213 is followed by act 214 in which the new intensity is used to overwrite an existing intensity, and hence the new grayscale image 262 is formed as a combination of (a) new intensities for grayscale pixels stored in act 214 after act 213, and (b) original grayscale image's previously existing intensities that are retained untouched (via branch 214 to act 215).

In several of the embodiments described in the immediately preceding paragraph, after act 214, an act 215 causes acts 211-214 and branches 216 and 217 to be performed repeatedly in a loop. Specifically, in some embodiments, act 215 checks whether any more grayscale pixels need to be visited, and if yes processor 604 returns to act 211 described above. Thus the above-described acts 211-215 of checking, using and storing as well as branches 216-217 for retaining are performed again, e.g. by selecting another pixel at the location (x3, y2) as the current pixel, followed by forming a group of pixels, such as group 263 (FIG. 2F). Hence, several pixels in the original grayscale image 260 are visited (e.g. every pixel may be visited, or every other pixel may be visited by skipping an intervening pixel there-between, depending on the embodiment).

When the answer in act 215 is no, operation of selective contrast enhancer 210 is completed, and processor 604 goes to operation 220 (FIG. 2A). On completion of operation of selective contrast enhancer 210, processor 604 has stored in memory 501, a new grayscale image 262 which in some embodiments is a composite of intensity values of four monochrome images (gray, red, green or blue). Specifically, in certain embodiments an intensity value at each location (x, y) is selected from a group consisting of old Igray, Ired, Igreen or Iblue, to form new grayscale image 262. Therefore, new grayscale image 262 of some embodiments has Mo pixels at which the intensity is old Igray, Mr pixels at which the intensity is Ired, Mg pixels at which the intensity is Igreen, and Mb pixels at which the intensity is Iblue, with the values of Mo, Mr, Mg and Mb depending on measures of contrast in the four monochrome images (gray, red, green or blue), and the total number of pixels M in new grayscale image 262 being M=Mo+Mr+Mg+Mb, wherein Mo is non-zero and at least one of Mr, Mg, or Mb is non-zero. Thus, in several embodiments, a new grayscale image 262 is a composite of (A) intensities in any of three monochrome images included in color image 250 or video frame (at locations identified as having insufficient contrast for OCR in original grayscale image 260), and (B) intensities existing in the original grayscale image 260 (at locations identified as having sufficient contrast for OCR in original grayscale image 260).

In operation 220 (FIG. 6) of some embodiments, processor 604 binarizes the new grayscale image 262 using a binarizer 515 followed by optical character recognition (OCR) and word decoding in module 440. Decoding of a word, in a region of new grayscale image 262 likely to be text (e.g. indicated by applying to the region, a test for presence of text), is associated with a level of confidence in decoding, by operation 220. In an act 221 (FIG. 2A) of such embodiments, processor 604 checks whether the confidence level associated with decoding is above a minimum limit that is predetermined. If the answer in act 221 is yes, processor 604 goes to act 222 in which word 229 of text is stored in memory 501, and subsequently used in displaying an output on screen 607, e.g. the recognized word 229 is itself output or information retrieved by use of the recognized word 229 is output.

In act 221, if the decoding confidence level of word 229 is found to be below the minimum limit, the "no" branch is taken to act 225 (FIG. 2A). In act 225, a histogram of pixel intensities in a region of new grayscale image 262 is checked for occurrence of a peak, within a range of intensities of grayscale pixels (with the range being selected empirically in some embodiments) in the region (which, as noted above, satisfies a test for presence of text). When a peak is not found in the range, a rectangular block which includes the region is binarized again, this time using a threshold which is selected based on the histogram (also referred to herein as "re-binarized"), followed by repeating OCR on the re-binarized block, followed by output of the recognized word 229, similar to that described above.

In some embodiments, operation 220 is performed after act 201 and act 202 (FIG. 2A), as shown by dashed lines 223 and 224. Specifically, after acts 201 and 202, branch 223 causes processor 604 to transition to operation 220 wherein the original grayscale image 260 is binarized, followed by OCR and decoding of a word, in a region likely to be text in original grayscale image 260 (as indicated by a test for text presence). After operation 220, act 221 (described above) is performed, and if the answer is yes, act 222 is performed (also described above). In act 221 if the answer is no, processor 604 operates as selective contrast enhancer 210 (described above) by transitioning thereto via branch 224. On completion of operation as selective contrast enhancer 210, new grayscale image 262 is subject to operation 220, e.g. binarized, followed by OCR, and word decoding, and then act 221 is again performed and when the answer in act 221 is no, act 225 is performed to re-binarize the new grayscale image 262, as described above.

The above-described test for low contrast which is performed by processor 604 in act 212 on a group of grayscale pixels can be different in different embodiments. In some embodiments of the type illustrated in FIG. 3A, a low contrast test for a current pixel is performed by processor 604 computing in an act 312A, the variance of intensities in the group of grayscale pixels, as a sum of squares of differences between (a) intensities of grayscale pixels in the group, and (b) a mean intensity of the group. Act 312A (FIG. 3A) is followed by an act 312B in which processor 604 compares the variance against a limit and the test fails when the variance is below the limit. Instead of variance, the above-described test for low contrast in act 212 by processor 604 may use another statistical characteristic, such as standard deviation, in other embodiments.

Some embodiments of act 213 (FIG. 3A) are based on a color model wherein a tuple of a color pixel has N color channels. In several such embodiments, processor 604 performs an act 313A to compute a measure of contrast (such as variance or standard deviation) in each of the N color channels. Thereafter, processor 604 performs an act 313B to select a specific color channel, for having the highest measure of contrast among the N color channels. For example, certain embodiments automatically compute variance of a group of pixels identically located in each color channel, to find a specific color channel having the highest variance among the N color channels. Finally, in act 313C, processor 604 uses an intensity of a color channel that is selected in act 313B, to determine a new intensity for the grayscale pixel.

For example, in certain embodiments based on the RGB color model, an intensity Ired at location (x2, y2) in group 271 (FIG. 2C) may be automatically selected in act 313B as the new intensity which is to replace existing intensity old Igray at location (x2, y2) in group 261 (FIG. 2B). In this example, in act 313C processor 604 obtains intensity Ired from a tuple of the color pixel at location (x2, y2) in color image 250 or video frame, as the intensity of the red color channel determined by processor 604 for providing the highest contrast, among the three color channels Red, Green and Blue. Then, also in act 313C, processor 604 determines the new intensity, e.g. sets new Igray=Ired. Other embodiments may compute new Igray in act 313C using a selected color's intensity Ired in a predetermined formula. Such a predetermined formula may use, e.g. an existing intensity old Igray of the grayscale pixel in original grayscale image 260.

New intensities which are determined in act 213 can be from different color channels in different regions of an image, depending on whichever color channel provides the most contrast in each region. In an example shown in FIG. 3B, a region of pixels containing a Devanagari letter क at the beginning of a line of text 253 in grayscale image 299 is found in act 212 (FIG. 3A) to have low contrast, and the blue color channel is determined in act 213 to provide the most contrast. Hence, intensities Iblue of pixels in the blue monochromatic image 103 located at the beginning of the line of text 113 (FIG. 3B) are used to determine intensities Igray of grayscale pixels at the beginning of a corresponding line of text 253 in grayscale image 299.

Figure 3A:
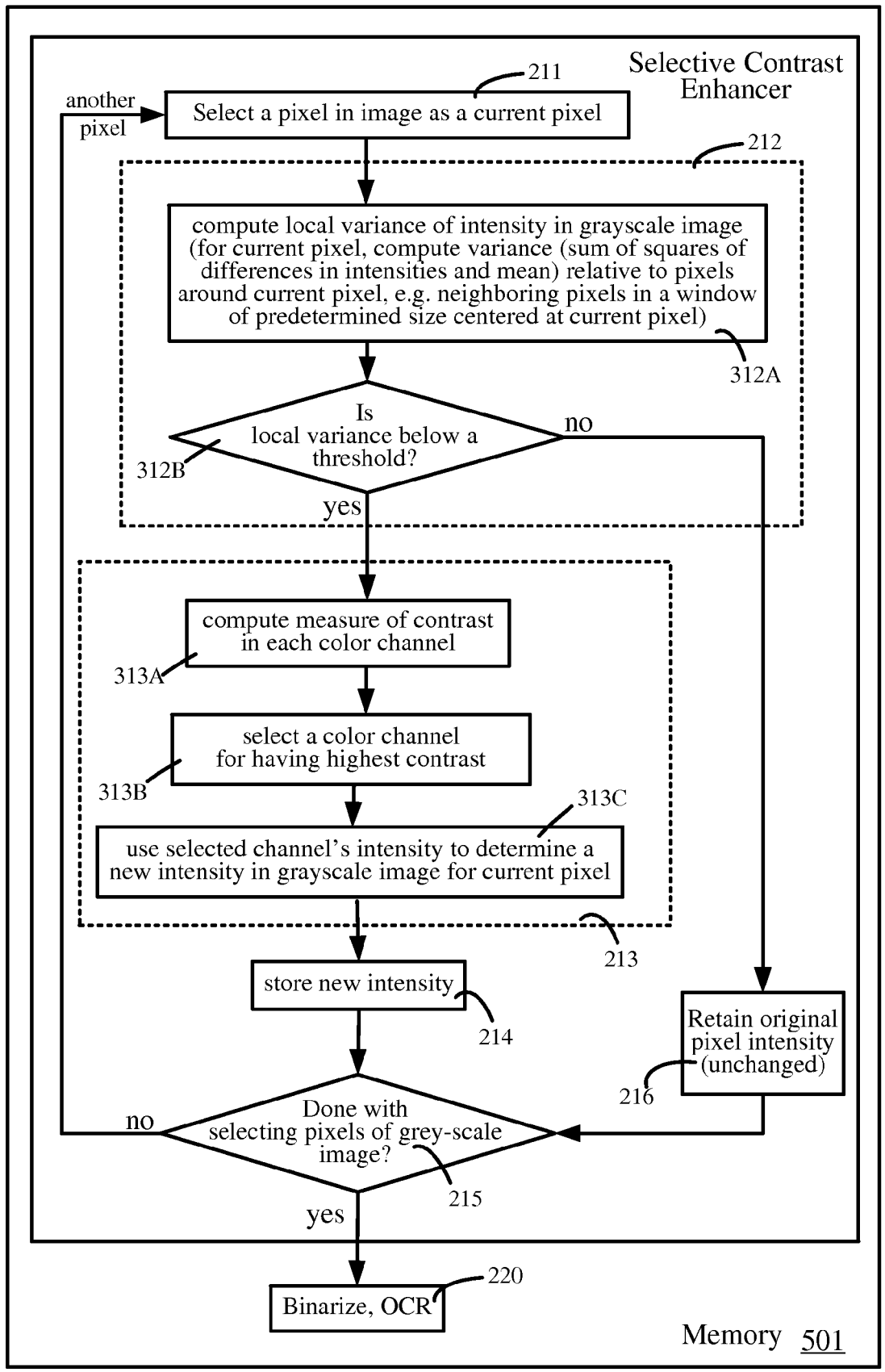
FIG. 3A illustrates, in an intermediate-level flow chart, acts performed by one or more processors 604 of mobile device 601 to implement a selective contrast enhancer 210 of FIG. 2A in certain embodiments.
Figure 3B:
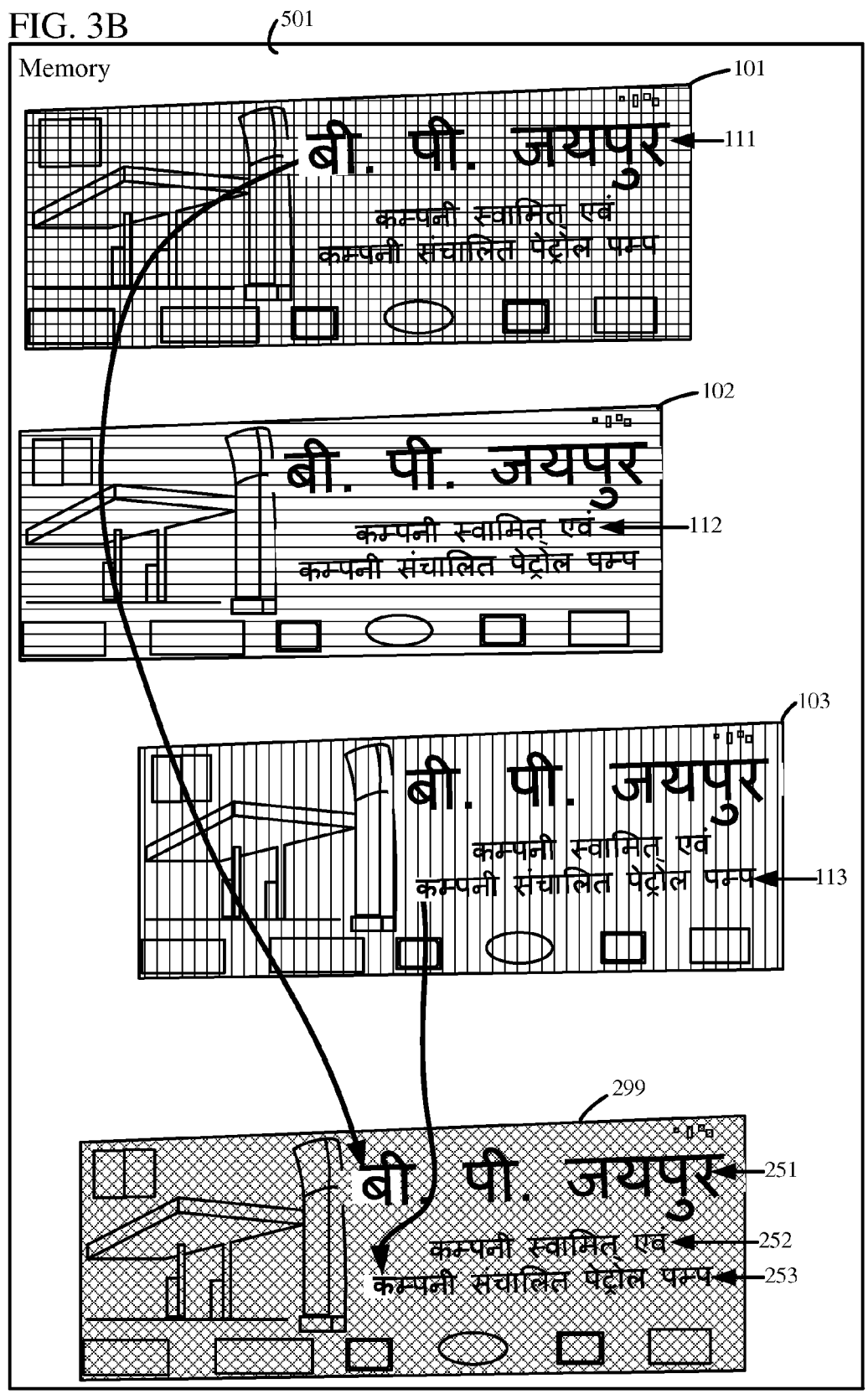
FIG. 3B illustrates a new grayscale image 299 formed by performing the method of FIG. 3A on grayscale image 104 of FIG. 1E, by selectively replacing one or more intensities therein with corresponding one or more intensities in one of the monochrome images 101, 102 and 103 of FIGS. 1B-1D.

Also as shown in FIG. 3B, another region of pixels containing another Devanagari letter ब at the beginning of another line of text 251 in grayscale image 299 is found in act 212 (FIG. 3A) to have low contrast, and this time the red color channel is determined in act 213 to provide the most contrast. Hence, intensities Ired of pixels in the red monochromatic image 101 at the beginning of a line of text 111 (FIG. 3B) are used to replace intensities Igray of grayscale pixels at the beginning of line of text 251. In this same example, still another region of pixels in the line of text 112 in the original grayscale image 260 has high contrast, so intensities of pixels in the corresponding line of text 252 in the new grayscale image 299 are retained unchanged (i.e. these are Igray).

In some embodiments, a window size which is used to identify the group of grayscale pixels used in act 212 (FIG. 2A) is pre-defined manually, ahead of time, by a manufacturer of software 610. The window size is selected to be not too small, relative to the stroke width of characters (or height of characters) to be recognized in the image. In such embodiments, software 610 does not handle characters of text below a height that is predetermined (e.g. preset to 50 pixels), and the window size is selected to be a predefined fraction (~25%) of the text height (e.g. 15 pixels). When the text is too big (e.g. 150 pixels high), the window size can become too small relatively (e.g. an order of magnitude small), which can result in artifacts (called "holes") in new grayscale image 262 on completion of operation of selective contrast enhancer 210, which may be handled in some embodiments, as described next.

In some embodiments, processor 604 is programmed to perform a two step process described next, to avoid artifacts (called "holes") that may otherwise arise when a window size that is used in act 312A (FIG. 3A) to compute local variance in intensities of grayscale pixels (e.g. the 3×3 block centered at a current grayscale pixel) is too small relative to stroke width of a character of text, which can result in use of the window not identifying variance in intensities of a group of grayscale pixels at a scale of characters of text. Specifically, in a first step of the hole-avoidance process, for a current pixel, processor 604 picks whichever channel has the highest local variance (call this variance MAX_VAR), followed by checking if MAX_VAR is above a threshold, and if yes then choosing the intensity value of that channel as the value of the current pixel (and the current pixel is hereinafter MARKED). When MAX_VAR is not above the threshold, processor 604 pushes the current pixel into a list called UNMARKED.

Subsequently, processor 604 performs a second step of the hole-avoidance process as follows. For each pixel in UNMARKED, processor 604 looks at its immediate neighbors that are MARKED, and picks the channel that won for a majority of them in the first step. Then, processor 604 chooses the intensity value of this channel as the value of the current pixel, followed by removing the current pixel from the list UNMARKED, and the current pixel is MARKED. Processor 604 iterates over the second step as needed, until the list UNMARKED is empty, which completes the hole-avoidance process.

Although some embodiments of processor 604 selects a color channel for each pixel (in a grayscale image) found to have low contrast (also called "pixel-by-pixel method"), other embodiments of processor 604 use a selected color channel not only for a current pixel and also use the same selected color channel for one or more pixels that are adjacent to the current pixels (also called "zonal method"). Specifically, processor 604 of certain embodiments divides the original grayscale image 260 into zones of a predetermined size (e.g. the image is subdivided zones, using a G×G grid), followed by selecting a color channel for each zone. In one illustrative embodiment, processor 604 is programmed to perform the following acts for each zone: (a) Take the union of all the local neighborhoods for each pixel in that zone; (b) Find the channel with highest local variance in this union of local neighborhoods; (c) Use this channel for all the pixels in the zone.

Figure 4A:
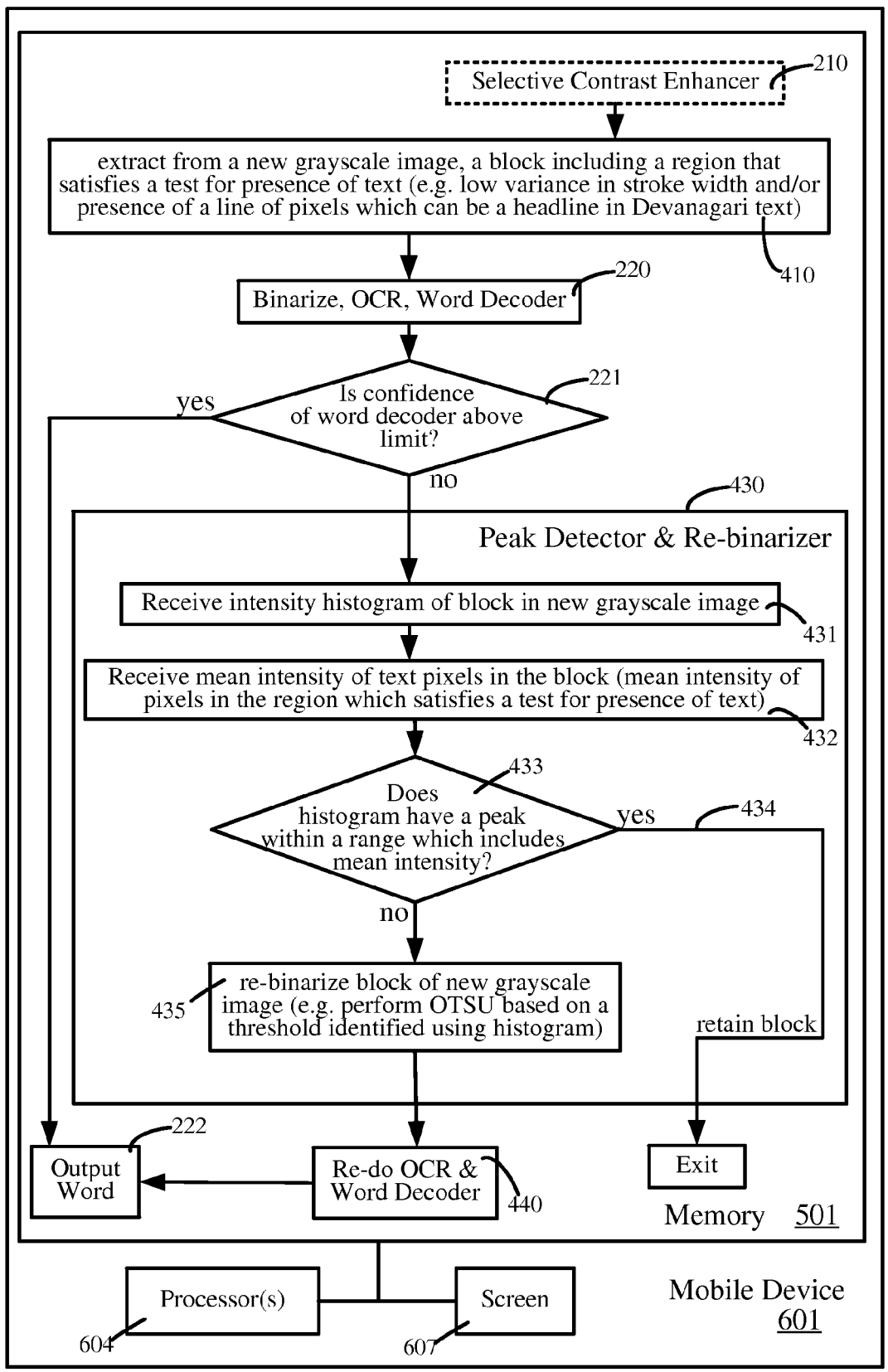
FIG. 4A illustrates, in an intermediate-level flow chart, acts performed by one or more processors 604 of mobile device 601 in several described embodiments, to improve contrast in a region 401 of FIG. 4B.

In some embodiments, processor 604 of mobile device 601 is programmed with software 610 (FIG. 6) to implement a peak detector and re-binarizer 430 illustrated in FIG. 4A. Specifically, in some embodiments, after operation as selective contrast enhancer 210 (described above), processor 604 performs an operation 410 to extract from the new grayscale image 262, a rectangular block that satisfies one or more tests indicative of pixels in a connected component in the block being text pixels. The pixels in a connected component in such a block may be identified, e.g. by use of any method that identifies maximally stable extremal regions (MSERs). A test for presence of text pixels in a rectangular block that contains a region identified as a connected component is performed by processor 604 in operation 410 by checking, for example, for presence in the region of a straight line of pixels of a specific binary value (a line-presence test indicative of a headline in Devanagari text), and/or whether variance of stroke width of the region is low, e.g. below a preset limit. Stroke width is computed in some embodiments as illustrated in FIGS. 3A and 3B and related description in U.S. patent application Ser. No. 13/831,237, which is incorporated by reference herein.

Accordingly, processor 604 subjects blocks that have regions satisfying a test for text presence to operation 220, e.g. binarize, followed by OCR, and word decoding, and then act 221 is performed (as noted above in reference to FIG. 2A), followed by outputting a recognized word in act 222. When the answer in act 221 is no, processor 604 operates as peak detector and re-binarizer 430 by performing acts 431-435 (FIG. 4A) as follows.

In act 431, processor 604 receives a histogram of intensities of grayscale pixels in a block that is likely to contain text in new grayscale image 262. For example, after block 401 (FIG. 4B) is identified by operation 410, processor 604 performs an act 431 to receive from memory 501, a histogram 402 represented graphically in FIG. 4B wherein counts are plotted along the y-axis, and intensities are plotted along the x-axis. Histogram 402 has a series of bins that are uniquely identified by different values of grayscale pixel intensities Igray, e.g. 256 values, and each bin maintains a count of the number of pixels in new grayscale image 262 that have the bin's intensity value. Such a histogram of intensities of grayscale pixels is also referred to herein as a first type of histogram. In act 432, processor 604 receives a mean intensity Imt of text pixels, which are pixels identified as belonging to a text region (such as MSER satisfying a test for text presence) in the block (whose histogram of intensities is received in act 431).

Subsequently, in act 433 (FIG. 4A), processor 604 checks whether the histogram 402 received in act 431 has a peak that occurs within a predetermined distance of the mean Imt of text pixels (shown as white pixels in block 401 in FIG. 4B). For example, processor 604 checks whether a peak occurs in a range defined by a predetermined intensity differential $\Delta$ centered at mean intensity Imt, for example the range Imt$-\Delta$ to Imt$+\Delta$ along the x-axis in FIG. 4B. In histogram 402 shown in FIG. 4B, although a local maxim 402T occurs in a bin at x-coordinate Imt, the counts in the range Imt$-\Delta$ to Imt$+\Delta$ do not satisfy a test for presence of a peak. Such a test may be, for example, whether a ratio of (a) maximum value of counts in the range Imt$-\Delta$ to Imt$+\Delta$ to (b) average value of counts in the range Imt$-\Delta$ to Imt$+\Delta$, exceeds a preset limit thereon.

Figure 4B:
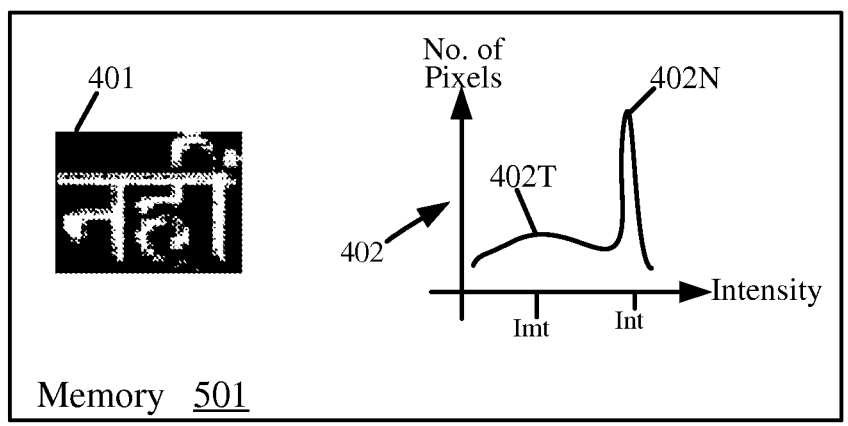
FIG. 4B illustrates, in memory 501 of mobile device 601 of several described embodiments, region 401 of a new grayscale image 262 and a corresponding histogram 402 of pixel intensities, with two local maxima 402T and 402N occurring at mean intensities of two types of pixels, text pixels and non-text pixels respectively.

In FIG. 4B, a peak 402N occurs at another local maxima in a bin at the x-coordinate Int, although its location is outside of the range Imt$-\Delta$ to Imt$+\Delta$. In FIG. 4B, Int is a mean intensity of pixels in block 401 that do not belong to the region (i.e. non-text pixels, shown as black pixels in block 401 in FIG. 4B). Non-text pixels are pixels that are located outside a text region but inside a rectangular block that surrounds the text region. Hence, in the example illustrated in FIG. 4A, on completion of act 433 (FIG. 4A), processor 604 takes the "no" branch and goes to act 435.

Figure 4C:
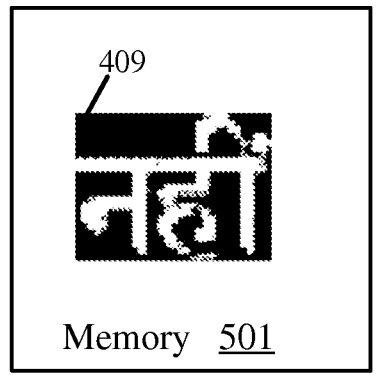
FIG. 4C illustrates, in memory 501, a region 411 of an ideal image and a corresponding histogram 412 of pixel intensities, with local maxima 411T and 412N.

In act 435, processor 604 binarizes pixels in the block of new grayscale image 262 based on a threshold identified using histogram 402. Specifically, in some embodiments of act 435, processor 604 identifies a threshold, followed by binarization as described in an article entitled "Otsu Thresholding" by Dr. Andrew Greensted, at The Lab Book Pages, http://www.labbookpages.co.uk/software/imgProc/otsuThreshold.html published 17 Jun. 2010, which is incorporated by reference herein in its entirety. The binarized block 409 (FIG. 4C) resulting from act 435 is then subjected to OCR and word decoding in operation 440 (FIG. 4A), followed by act 222 to output the recognized word (when a confidence level associated with the word exceeds the preset minimum).

Figure 4D:
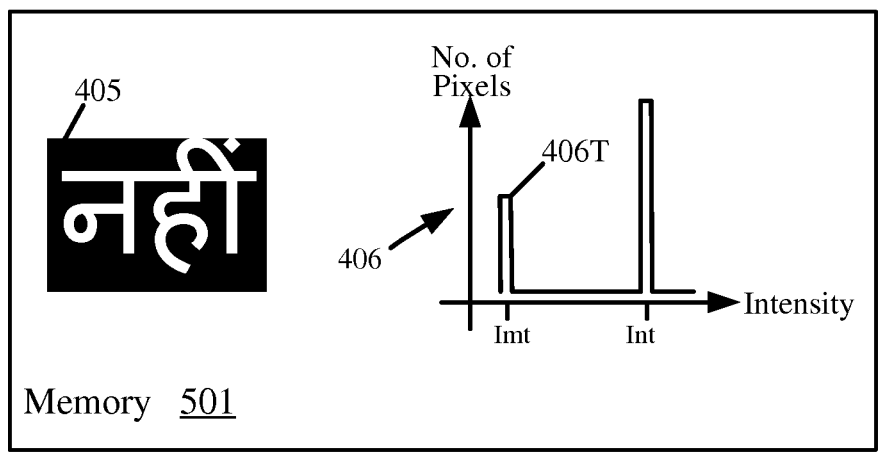
FIG. 4D illustrates, in memory 501 of mobile device 601 of several described embodiments, a region 421 obtained by using histogram 402 of FIG. 4A to re-binarize region 401, by performing one or more acts illustrated in FIG. 4A.

In act 433, the answer is yes with certain images wherein a peak is detected at the mean intensity Imt of text pixels. For example, as illustrated in FIG. 4D, when block 405 is subjected to act 433, processor 604 detects a peak 406T in the range Imt$-\Delta$ to Imt$+\Delta$ in histogram 406. Accordingly, processor 604 takes branch 434 (FIG. 4A) to retain the block unchanged, followed by exiting the operation of peak detector and re-binarizer 430.

In some embodiments, processor 604 is programmed with software to implement each of the blocks illustrated in FIG. 5A as follows. Specifically, processor 604 operates as selective contrast enhancer 210 (described above) on an original grayscale image 260 as a pre-processing step to generate new grayscale image 262. In such embodiments, selective contrast enhancer 210 is followed by processor 604 performing candidate region extraction in operation 510 illustrated in FIG. 5A. Specifically, operation 510 of several embodiments includes processor 604 programmed to perform connected component extraction 511, skew detection and rectification 512, line presence testing 513, and clustering rules application 514. Operation 510 is followed by processor 604 performing binarization 520. Binarization 520 is followed, in some embodiments by processor 604 performing local contrast improvement by operation as peak detector and re-binarizer 430 (described above).

Peak detector and re-binarizer 430 is followed by processor 604 performing verification 530, segmentation 540, OCR and word decoding in operation 440 (FIG. 4A). The above-described arrangement can be different, e.g. binarization 520 may be followed, in certain embodiments by processor 604 performing verification 530 as shown by branch 533 (FIG. 5B) in which case operation 440 is followed by operation of processor 604 as peak detector and re-binarizer 430 as shown by branch 534 (FIG. 5B). Moreover, depending on the embodiment, arrangements described above may include operation of processor 604 to implement feedback, as shown in FIG. 5B (described below).

In some embodiments, processor 604 is programmed to perform binarization 520 (FIG. 5A) as follows. For a potential text cluster: (a) Compute the mean foreground color (based on the MSER points) and the mean background color (based on the complementary pixels), (b) Go through each connected component (CC) in the cluster as follows. For each CC: (1) Check if a pixel in this CC is closer to the forground color compared to the background color, and (2) If yes, mark this pixel as white in the binarized image, Otherwise mark it black. Processor 604 is further programmed to implement re-binarizer 435 (FIG. 5A) using an alternate binarization method to binarize a possible text cluster, when a histogram of intensities of grayscale pixels indicates this cluster to be of low-contrast. One example of the alternate binarization method used to implement re-binarizer 435 is binarization based on Otsu Thresholding, using a threshold to maximize inter class variance.

Figure 5A:
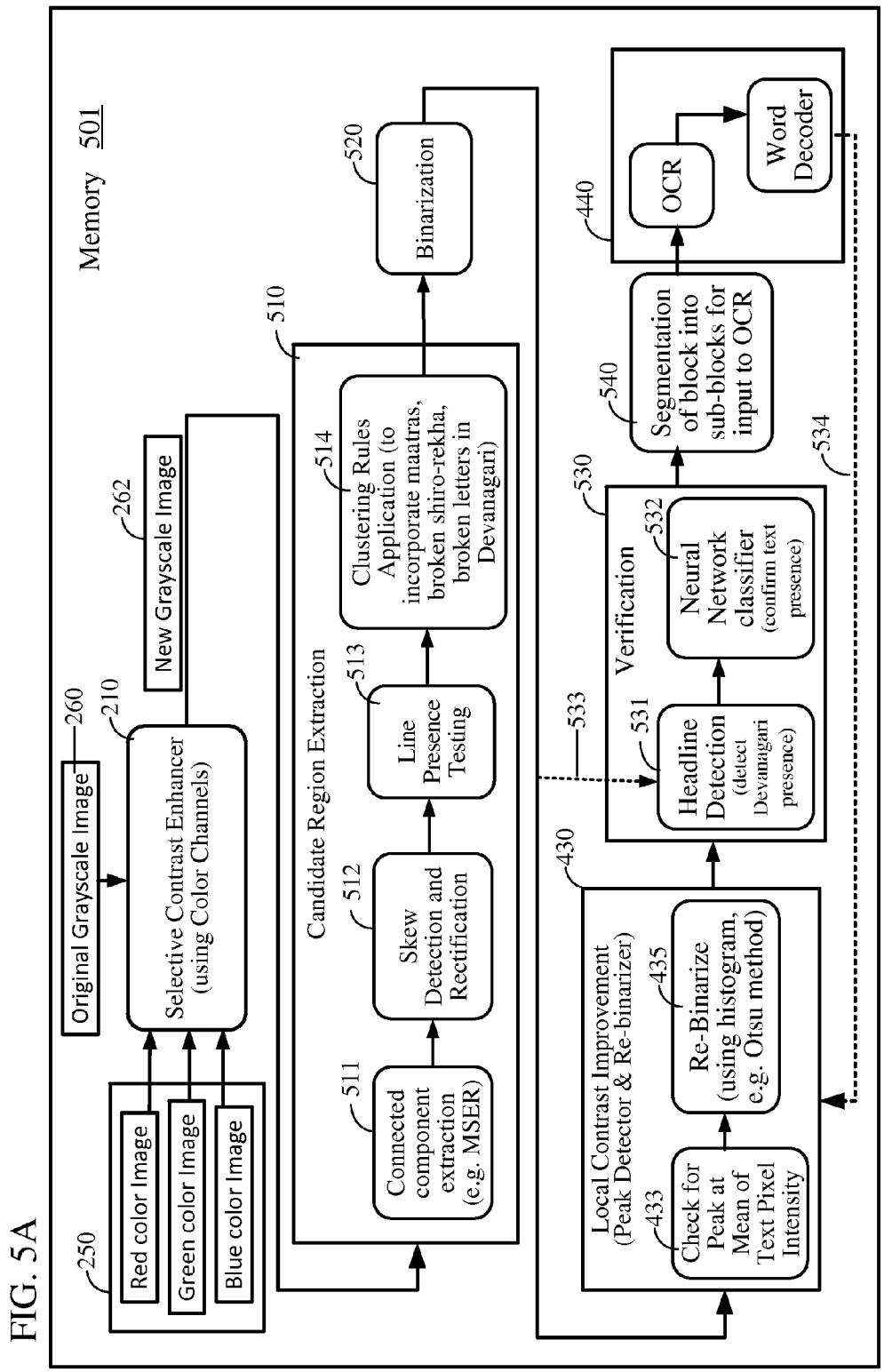
FIG. 5A illustrates, in a high-level flow chart, acts performed by one or more processors 604 of mobile device 601 in several embodiments that implement feedback.
Figure 5B:
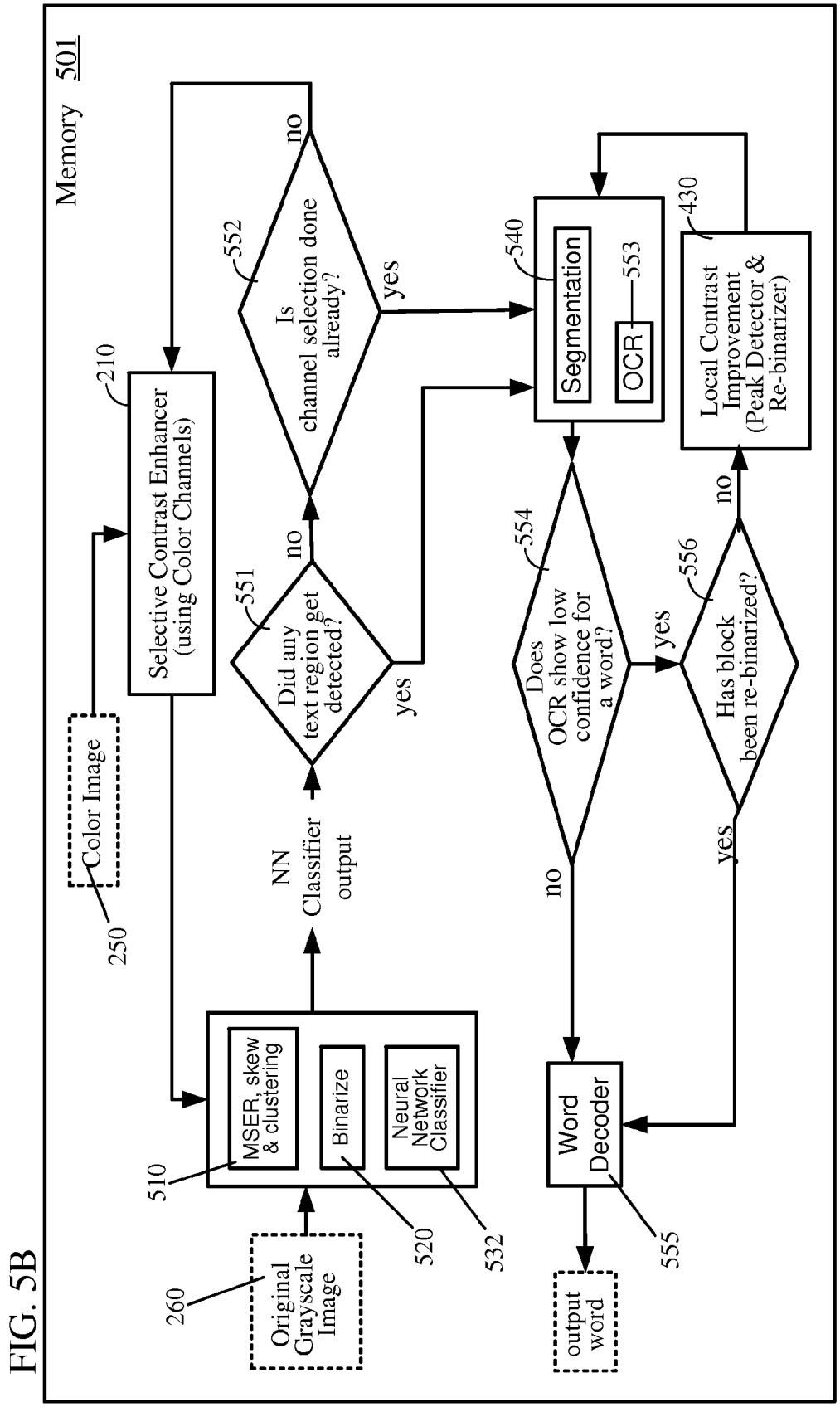
FIG. 5B illustrates, in a data flow diagram, a series of blocks of logic used in a mobile device 601 of several embodiments, to improve contrast of a natural image or video frame, for use in text extraction and recognition applications.

Connected component extraction 511 of FIG. 5A identifies specific grayscale pixels of new grayscale image 262 in a set (which may be implemented in a list) that in turn identifies a region $Q_i$ which includes a local extrema of intensity (such as local maxima or local minima) in new grayscale image 262. Such a region $Q_i$ may be identified in connected component extraction 511 as being maximally stable relative to one or more intensities in a range $i-\Delta$ to $i+\Delta$ (depending on the embodiment, including the above-described intensity i), each intensity i being used as a threshold (with $\Delta$ being a parameter input to an MSER method) in comparisons with intensities of a plurality of pixels included in region $Q_i$ to identify respective regions $Q_{i-\Delta}$ and $Q_{i+\Delta}$. In some embodiments, a number of pixels in the region $Q_i$ remains within a predetermined (e.g. user specified) range relative to changes in intensity i across a range $i-\Delta$ to $i+\Delta$, with a local minima in a ratio $[Q_{i-\Delta}-Q_{i+\Delta}]/Q_i$ occurring at the intensity i. Therefore, the just-described set of positions in certain embodiments are indicative of (or identify) a region $Q_i$ that constitutes an MSER (i.e. a maximally stable extremal region).

In several embodiments of mobile device 601, regions in new grayscale image 262 are automatically identified in connected component extraction 511 based on variation in intensities of pixels by use a method of the type described by Matas et al., e.g. in an article entitled "Robust Wide Baseline Stereo from Maximally Stable Extremal Regions" Proc. Of British Machine Vision Conference, pages 384-396, published 2002 that is incorporated by reference herein in its entirety. The time taken to identify MSERs can be reduced by use of a method of the type described by Nister, et al., "Linear Time Maximally Stable Extremal Regions", ECCV, 2008, Part II, LNCS 5303, pp 183-196, published by Springer-Verlag Berlin Heidelberg that is also incorporated by reference herein in its entirety. Another such method is described in, for example, an article entitled "Robust Text Detection In Natural Images With Edge-Enhanced Maximally Stable Extremal Regions"

by Chen et al, IEEE International Conference on Image Processing (ICIP), September 2011 that is incorporated by reference herein in its entirety.

Connected component extraction 511 of some embodiments is performed as described in U.S. patent application Ser. No. 13/748,539 filed on Jan. 23, 2013 by Pawan Kumar Baheti et al, entitled "IDENTIFYING REGIONS OF TEXT TO MERGE IN A NATURAL IMAGE OR VIDEO FRAME" which is incorporated by reference herein in its entirety. After a connected component is identified, processor 604 of some embodiments uses pixels in the connected component to identify the four corners of a rectangular block that tightly fits the connected component, based on largest and smallest x and y coordinates of positions of pixels in the connected component. In some embodiments, the positions of the four corners of the block are stored in memory 501, for use in skew detection and rectification 512.

Skew detection and rectification 512 detects and corrects skew in some embodiments based on prompting for and receiving user input on tilt or skew, while other embodiments automatically search coarsely, followed by searching finely within a coarsely determined range of tilt angle. Hence, in several embodiments it is the skew-corrected blocks that are subjected to line presence testing 513. In some embodiments, skew detection and rectification 512 also identifies presence of a line of pixels, and hence line presence testing 513 is performed as steps within skew detection and rectification 512. A specific manner in which skew is corrected in skew detection and rectification 512 can be different in different embodiments.

Skew detection and rectification 512 in some embodiments is performed with user input as described in U.S. patent application Ser. No. 13/748,562 filed on Jan. 23, 2013 by Pawan Kumar Baheti et al, entitled "DETECTING AND CORRECTING SKEW IN REGIONS OF TEXT IN NATURAL IMAGES" which is incorporated by reference herein in its entirety. Skew detection and rectification 512 in some embodiments is performed automatically as described in U.S. patent application Ser. No. 13/831,237 filed on Mar. 14, 2013 by Pawan Kumar Baheti et al, entitled "AUTOMATIC CORRECTION OF SKEW IN NATURAL IMAGES AND VIDEO" which is incorporated by reference herein in its entirety.

Line presence testing 513 of some embodiments checks whether a test ("pixel-line-presence test" or simply "line-presence test") is satisfied, for detecting the presence of a line segment formed by pixels of the value 1 (which is a common binary value of all these pixels), within the rectangular block. In several such embodiments, line presence testing 513 checks for presence of pixels of a common binary value (or a common range of grey-scale values) occurring along a straight line that is oriented longitudinally relative to the block (e.g. parallel to or within a small angle of, whichever side of the block is longer). Such a straight line may be formed in the block by, for example, a number of pixels which include several pixels with intensity of value 1 in binary that are located in a single row (or in alternative embodiments, located in a group of adjacent rows). Line presence testing 513 is performed in certain embodiments as described in U.S. patent application Ser. No. 13/748,539 incorporated by reference above.

Clustering rules application 514 of some embodiments merges two or more blocks of connected components to form a merged block. Specifically, in certain embodiments of clustering rules application 514, processor 604 looks for and marks in memory 501, any block (pixel-line-present or pixel-line-absent) that is located physically adjacent to a block which is marked pixel-line-present and has no other block located there-between as being an "adjacent" block. After repeating the just-described act to identify all adjacent blocks, processor 604 merges a pixel-line-present block with a block adjacent to it, when they are sufficiently close to one another (as indicated by a specific test, e.g. a distance (or separation) between blocks is less than height of pixel-line-present block). On completion of the merger, pixels in a merged block include at least pixels in the pixel-line-present block and pixels in the adjacent block (which may or may not have a pixel line present therein). A specific technique that is used to merge two adjacent blocks can be different, depending on the embodiment. Clustering rules application 514 in some embodiments is performed automatically as described in U.S. patent application Ser. No. 13/748,574 filed on Jan. 23, 2013 by Pawan Kumar Baheti et al, entitled "RULES FOR MERGING BLOCKS OF CONNECTED COMPONENTS IN NATURAL IMAGES" which is incorporated by reference herein in its entirety.

Processor 604 of some embodiments may perform binarization 520 of FIG. 5A by assigning one of two binary values to each pixel in a block. In some embodiments, all pixels identified as constituting a region, which is represented by the above-described list (e.g. generated by an MSER method, with two coordinates for each pixel in the region) are assigned the value 1 (in binary), and all remaining pixels in a block of this region are assigned the value 0 (in binary). Hence, in some embodiments, all pixels within the block but outside the region are assigned the value 0, and are also referred to herein as non-text pixels. The just-described binary values may be switched in other embodiments (e.g. pixels of a region may be assigned the value 0 and pixels in a block that are outside the region assigned the value 1). The binary values assigned in binarization 520 to pixels in a block are used in verification 530, and these values can be overwritten, if binarization is performed again.

Processor 604 of some embodiments may perform verification 530 of FIG. 5A by headline detection 531 followed by operation of a neural network classifier 532. Headline detection 531 is performed in some embodiments by subdivision of a block into rows oriented parallel to the longitudinal direction of the block, followed by preparing a histogram of counters, based on pixels identified in a list of positions indicative of a region, with one counter being used for each unit of distance ("bin" or "row") along a height (in a second direction, which is perpendicular to a first direction (e.g. the longitudinal direction)) of the block. Such a histogram of counters of pixels that belong to a region, with counters arranged sequentially along a block's height, is also referred to herein as a second type of histogram.

In some embodiments, a block is oriented with its longest side along the x-axis, and processor 604 performs headline detection 531 by sorting pixels identified as belonging to a region by their y-coordinates followed by binning (e.g. counting the number of pixels) at each intercept on the y-axis (which forms a bin), followed by identifying a counter which has the largest value among counters. The identified counter identifies a peak in the histogram of counters, along a height of the block, which is followed by processor 604 checking whether a relative location of the peak (along the y-axis) happens to be within a predetermined range, e.g. top ⅓rd of block height, and if so a headline detection test is met and processor 604 initiates operation of neural network classifier 532. Neural network classifier 532 classifies the block as text or non-text (after training).

Headline detection 531 may be implemented in some embodiments as described in U.S. patent application Ser. No.

13/748,539 filed on Jan. 23, 2013 by Pawan Kumar Baheti et al, entitled "IDENTIFYING REGIONS OF TEXT TO MERGE IN A NATURAL IMAGE OR VIDEO FRAME" which is incorporated by reference herein in its entirety. Neural network classifier 532 may be implemented using machine learning methods (e.g. neural networks) as described at http://en.wikipedia.org/wiki/Machine_learning. Other methods to implement neural network classifier 532 that can also be used are described in, for example the following, each of which is incorporated by reference herein in its entirety:

a. Matteo Pardo and Giorgio Sberveglieri, "Learning From Data: A Tutorial With Emphasis on Modern Pattern Recognition Methods," IEEE Sensors Journal, vol. 2, no. 3, June 2002; and
b. Lasse Holmstrom, Petri Koistinen, Jorma Laaksonen and Erkki Oja, "Neural and Statistical Classifiers—Taxonomy and Two Case Studies," IEEE Transactions on Neural Networks, vol. 8, no. 1, January 1997.

Neural network classifier 532 of some embodiments uses learning methods of the type described in, for example, U.S. Pat. No. 7,817,855 that is incorporated by reference herein in its entirety.

Several operations and acts of the type described herein are implemented by processor 604 performing segmentation 540 of each block classified as text, by slicing the block into sub-blocks. The sub-blocks may be formed from a block using any known method e.g. based on height of the block and a predetermined aspect ratio of characters and/or based on occurrence of spaces outside the boundary of pixels identified as forming portions of a region located below a line of pixels in the block that constitutes a headline or shiro-rekha in Devanagari. The result of slicing a block by segmentation 540 is a sequence of sub-blocks. Each sub-block is then individually subject to optical character recognition (OCR) in operation 440. For example, some embodiments of OCR compare a feature vector of pixels in a sub-block with feature vectors for a set of characters of a language in a predetermined script such as Devanagari. A sequence of characters generated by OCR is decoded by a word decoder using a dictionary, to identify a word in a predetermined language, such as Hindi.

Instead of operating selective contrast enhancer 210 on the entirety of original grayscale image 260 in a pre-processing step, some embodiments operate selective contrast enhancer 210 on a block in which the word detector fails to detect a word, as illustrated in FIG. 5B. Specifically, in several embodiments, original grayscale image 260 is directly subjected to operation 510 which performs MSER processing, skew correction and cluster rule application as described above in reference to FIG. 5A. A block resulting from operation 510 is subject to binarization 520, followed by operation thereon of neural network classifier 532, to identify a block of text. The block which is classified as text by neural network classifier 532 is then subject to OCR and word decoder in segmentation 540 after act 551 (FIG. 5B).

In act 551, processor 604 checks whether any text block has been detected by the neural network classifier 532, and if so goes to segmentation 540. If act 551 finds that a text block has not been detected, then processor 604 transitions to act 552. In act 552 (see FIG. 5B), processor 604 checks whether color image 250 or video frame has been used to enhance the block and if not then processor 604 implements a feedback by operating as selective contrast enhancer 210. Accordingly, in such embodiments, the checking of a test for low contrast in selective contrast enhancer 210 is performed at least in response to a failure to detect any word of text (in act 551) after binarization 520. On completion of operation of selective contrast enhancer 210, processor 604 returns to operation 510 (FIG. 5B) but this time with a block of the new grayscale image 262 as input, followed by binarization 520, followed by operation thereon of neural network classifier 532. Then OCR and word decoder are again applied in operation 440, although, this time on the block of new grayscale image 262, followed by acts 551 and 552 (described above). When act 552 is performed at this stage, color image 250 or video frame has been already used, so the "yes" branch is now taken from act 552 to segmentation 540.

Segmentation 540 is followed by OCR module 553, after which processor 604 checks in act 554 whether OCR shows low confidence for a word. When act 554 determines that the confidence is sufficiently high, processor 604 takes the "no" branch and goes to word decoder 555. When act 554 determines that the confidence is too low, processor 604 takes the "yes" branch and goes to act 556 to check if the block had been re-binarized. When the answer in act 556 is yes, processor 604 goes to word decoder 555. When the answer in act 556 is no, processor 604 goes to peak detector and re-binarizer 430 for local contrast improvement, followed by feedback to segmentation 540. Accordingly, in such embodiments, the checking for presence of a peak in peak detector and re-binarizer 430 is performed at least in response to a failure to detect any word of text (in act 554) after segmentation 540 and OCR module 553.

In addition to processor 604 and memory 501 described above, a mobile device 601 of several embodiments includes camera 605 (FIG. 6) to generate a still image or a frame of a video, of a scene in the real world (also called "natural image"). Depending on the embodiment of mobile device 601, camera 605 may be a digital camera or a video camera. Mobile device 601 may further include sensors 606, such as accelerometers, gyroscopes, GPS sensor or the like, which may be used to assist in determining various attributes, such as a pose (including position and orientation) of mobile device 601 relative to a real world scene captured by camera 605. Those of skill in the art will appreciate that the techniques described herein can be adapted to identify portions of an image having a shape other than a rectangle, and to identify characters therein. In the above description, a single processor (such as processor 604) is sometimes described for convenience, although it is to be understood that multiple processors may be used, or multiple cores may be used, depending on the embodiment.

Mobile device 601 may include wireless transmitter and receiver 1010 and/or any other communication interfaces 1009. A transmitter (in wireless transmitter and receiver 1010), may be an IR or RF transmitter or a wireless a transmitter enabled to transmit one or more signals over one or more types of wireless communication networks such as the Internet, WiFi, cellular wireless network or other network.

As noted above, in some embodiments of mobile device 601, functionality in the above-described OCR module (e.g. OCR module 553) is implemented by processor 604 executing the software 610 in memory 501 of mobile device 601, although in other embodiments such functionality is implemented in any combination of hardware circuitry and/or firmware and/or software in mobile device 601. Hence, depending on the embodiment, various functions of the type described herein may be implemented in software (executed by one or more processors or processor cores) or in dedicated hardware 1012 or in firmware 1013 (e.g. in ROM 1007) or in any combination thereof.

Accordingly, depending on the embodiment, any one or more of OCR module module 553 can, but need not necessarily include, one or more microprocessors, embedded processors, controllers, application specific integrated circuits (ASICs), digital signal processors (DSPs), and the like. The term processor is intended to describe the functions implemented by the system rather than specific hardware. Moreover, as used herein the term "memory" refers to any type of non-transitory computer storage medium, including long term, short term, or other memory associated with the mobile platform, and is not to be limited to any particular type of memory or number of memories, or upon which memory is stored. Processor 604 and memory 501 of mobile device 601 may be implemented in a single chip in some embodiments.

Hence, methodologies described herein may be implemented by various means depending upon the application. For example, these methodologies may be implemented in firmware 1013 (FIG. 6) or software 610, or hardware 1012 or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. For a firmware and/or software implementation, the methodologies may be implemented with modules (e.g., procedures, functions, and so on) that perform the functions described herein.

A non-transitory computer-readable storage media tangibly embodying software instructions (also called "computer instructions") may be used in implementing the methodologies described herein. For example, software 610 (FIG. 6) may include program codes stored in memory 501 and executed by processor 604. Such a memory may be implemented within or external to processor 604. If implemented in firmware and/or software, the functions may be stored as one or more instructions or code on a computer readable medium. Examples include non-transitory computer readable storage media encoded with a data structure and non-transitory computer readable storage media encoded with a computer program.

Non-transitory computer readable media includes physical computer storage media. A storage medium may be any available non-transitory medium that can be accessed by a computer. By way of example, and not limitation, such non-transitory computer readable media can comprise RAM, ROM, Flash Memory, EEPROM, CD-ROM or other optical disk storage, magnetic disk storage or other magnetic storage devices, or any other non-transitory medium that can be used to store program code in the form of instructions (for execution by one or more processors) and/or data structures (for accessing data) and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although specific embodiments are illustrated and described herein for instructional purposes, various embodiments of the type described herein are not limited thereto. Hence, although mobile device 601 shown in FIG. 6 of some embodiments is a smartphone, in other embodiments the mobile device 601 is implemented by use of form factors that are different, e.g. in certain other embodiments item 601 is a mobile platform (such as a tablet, e.g. iPad available from Apple, Inc.) while in still other embodiments, the mobile device 601 is any electronic device or system. Illustrative embodiments of such an electronic device or system may include multiple physical parts that intercommunicate wirelessly, such as a processor and a memory that are portions of a stationary computer, such as a lap-top computer, a desk-top computer, or a server computer 1015 communicating over one or more wireless link(s) with wireless transmitter and receiver 1010 coupled to input circuitry enclosed in a housing that is small enough to be held in a hand.

Depending on a specific symbol recognized in a handheld camera captured image, a user can receive different types of feedback depending on the embodiment. Additionally haptic feedback (e.g. by vibration of mobile device 601) is provided by triggering the circuitry 1018 (FIG. 6) to provide haptic feedback in some embodiments, to provide feedback to the user when a word of text is recognized in an image. Instead of the just-described haptic feedback, audio feedback may be provided via a speaker 608 in mobile device 601, in other embodiments.

Some embodiments of an apparatus described herein use at least one non-transitory computer readable storage media such as memory 501 which stores a plurality of instructions (such as software 610) to be executed by processor 604. Processor 604 is coupled to memory 501 in the normal manner, by one or more buses, e.g. via a bus interface unit through which data and/or instructions in memory 501 are accessed by processor 604. The just-described plurality of instructions may include, depending on the embodiment, some or all of the following: first instructions to receive a color image of a scene of real world captured by a camera 605 of a mobile device 601, as per act 201 in FIG. 2A; second instructions to receive a first grayscale image generated from the color image as per act 202 in FIG. 2A; third instructions to check whether a plurality of groups of grayscale pixels in the first grayscale image meet a predetermined test for low contrast as per act 212 in FIG. 2A; fourth instructions, responsive to the predetermined test being met by a first group, to use at least a first tuple component in a tuple of a first color pixel in the color image to determine for a first grayscale pixel in the first group, a first new intensity which is to replace a first existing intensity of the first grayscale pixel in the first grayscale image as per act 213 in FIG. 2A; fifth instructions, responsive to the predetermined test being not met by a second group, to retain unchanged a second existing intensity of a second grayscale pixel in the second group as per branch 216 in FIG. 2A; and sixth instructions to store in a memory a second grayscale image comprising the first new intensity for the first grayscale pixel and the second existing intensity of the second grayscale pixel as per act 214 in FIG. 2A.

The plurality of instructions described in the previous paragraph above may include: additional instructions to check whether a second test for presence of a first peak is met, in a histogram of intensities of grayscale pixels located in a rectangular block that encloses within the second grayscale image, a location corresponding to the first grayscale pixel in the first grayscale image as per act 433 in FIG. 4A; instructions to check whether a third test for presence of a second peak is met, in a histogram of counters along a height of the rectangular block as per operation 531 in FIG. 5A. In some embodiments, the second test is checked at least when confidence of decoding of a word in the rectangular block is not above a limit, as per act 221 (FIG. 4A). Such a plurality of instructions may include further instructions, responsive to a second test being not met, to binarize a first rectangular block in the second grayscale image, based on a threshold identified by use of a histogram of intensities of grayscale pixels, as per act 435 in FIG. 4A.

As illustrated in FIG. 3B (described above), intensity Iblue in a first color pixel in a blue monochromatic image 103 is a first tuple component which is used to replace an existing intensity of a first grayscale pixel in the Devanagari letter क at the beginning of a line of text 253. In this example (as described above), a second group of pixels in the line of text 252 do not meet the low contrast test, so a second existing intensity of a second grayscale pixel in the line of text 252 is retained unchanged (i.e. Igray) in image 299. Finally, the predetermined test is met by a third group of pixels in the line of text 251 (FIG. 3B), and a second tuple component, namely intensity Ired in the tuple of a third color pixel in the red monochrome image 101 is used as a third new intensity to replace a third existing intensity of a third grayscale pixel in the third group.

The above-described third instructions, when executed by one or more processors coupled to one or more memories may be included in means for checking whether a plurality of groups of grayscale pixels in the first grayscale image meet a predetermined test for low contrast in some embodiments. In certain embodiments, the means for checking includes a digital comparator in an arithmetic logic unit (ALU) in a central processing unit (CPU) of a processor in a computer. Thus, means for checking of some embodiments may be implemented to include one or more circuits similar or identical to a binary comparator, such as TTL 7485 from Texas Instruments, or 74HC/HCT85 from Philips Semiconductors. Accordingly, hardware circuitry to implement "means for checking" is readily apparent in view of this description.

The above-described fourth instructions, when executed by one or more processors coupled to one or more memories may be included in means for using at least one component in a tuple of a first color pixel in the color image to determine for a first grayscale pixel in the first group, a first new intensity which is to replace a first existing intensity of the first grayscale pixel in the first grayscale image. In some embodiments, the means for using is implemented by one or more processors in a computer performing acts 313A-313C described above (see act 213 in FIG. 3A).

The above-described fifth instructions and sixth instructions when executed by one or more processors coupled to one or more memories may be included in means for storing in the memory, a second grayscale image comprising the first new intensity for the first grayscale pixel and a second existing intensity of a second grayscale pixel, the second grayscale pixel being comprised in a second group, the second group being comprised in the plurality of groups of grayscale pixels.

In several embodiments, the above-described first, second, third, fourth, fifth and sixth instructions are stored in a non-transitory computer-readable storage media, and when executed by a processor cause the processor to perform steps in a method to use color images to enhance grayscale images used in text extraction as described herein.

Certain embodiments of non-transitory storage media of the type described above may store a group of instructions to check for presence of a line of pixels of a common binary value as illustrated by operation 410 in FIG. 4A (which when executed by one or more processors may constitute means for further checking).

Various adaptations and modifications may be made without departing from the scope of the described embodiments. Numerous modifications and adaptations of the embodiments described herein are encompassed by the attached claims.

The invention claimed is:

1. A method of using color images to enhance grayscale images used in text extraction, the method comprising:
receiving a color image of a scene of real world captured by a camera of a mobile device;
receiving a first grayscale image generated from the color image;
checking whether a plurality of groups of pixels meet a predetermined test for low contrast;
wherein the predetermined test is performed on color pixels in the color image or on grayscale pixels in the first grayscale image or on any characteristics thereof in combination;
in response to the predetermined test being met by a first group, the first group being comprised in the plurality of groups of pixels, using at least one component in a tuple of a first color pixel in the color image to determine for a first grayscale pixel in the first group, a first new intensity which is to replace a first existing intensity of the first grayscale pixel in the first grayscale image;
in response to the predetermined test being not met by a second group, the second group being comprised in the plurality of groups of pixels, retaining unchanged a second existing intensity of a second grayscale pixel in the first grayscale image; and
storing in a memory, a second grayscale image formed as a composite, by combination of at least the first new intensity for the first grayscale pixel and the second existing intensity of the second grayscale pixel.

2. The method of claim 1 wherein said at least one component in the tuple is hereinafter a first tuple component, the method further comprising:
in response to the predetermined test being met by a third group, the third group being comprised in the plurality of groups of pixels in the first grayscale image, using a second tuple component in the tuple of a third color pixel in the color image to determine for a third grayscale pixel in the third group, a third new intensity which is to replace a third existing intensity for the third grayscale pixel in the first grayscale image.

3. The method of claim 1 wherein:
the predetermined test comprises comparison of variance in intensities of a group of pixels with a predetermined limit.

4. The method of claim 1 wherein:
the tuple has N color channels;
a color channel is automatically selected for having highest contrast among the N color channels; and
an intensity of the color channel that is automatically selected is used in determining the first new intensity.

5. The method of claim 1 wherein:
the checking is performed at least in response to failure to detect after binarization, any word of text in a region that comprises the first group and the second group in the first grayscale image.

6. The method of claim 1 wherein the predetermined test is hereinafter a first test, the method further comprising:
checking whether a second test for presence of a peak is met, in a histogram of intensities of grayscale pixels located in a rectangular block that encloses within the second grayscale image, a location corresponding to the first grayscale pixel in the first grayscale image.

7. The method of claim 6 wherein the rectangular block is hereinafter a first rectangular block, the method further comprising:
when the second test is not met, binarizing the first rectangular block in the second grayscale image, based on a threshold identified by use of the histogram of intensities of grayscale pixels; and when the second test is met, retaining unchanged a second rectangular block in the first grayscale image corresponding to the first rectangular block in the second grayscale image.

8. The method of claim 6 wherein:
the second test is checked at least when confidence of decoding of a word in the rectangular block is not above a limit.

9. The method of claim 6 wherein the peak is hereinafter a first peak, the method further comprising:
checking whether a third test for presence of a second peak is met, in a histogram of counters along a height of the rectangular block.

10. A non-transitory computer-readable storage media comprising a plurality of instructions to use color images to enhance grayscale images used in text extraction, which, when executed by a processor perform steps in a method comprising:
receiving a color image of a scene of real world captured by a camera of a mobile device;
receiving a first grayscale image generated from the color image;
checking whether a plurality of groups of pixels meet a predetermined test for low contrast;
wherein the predetermined test is performed on color pixels in the color image or on grayscale pixels in the first grayscale image or on any characteristics thereof in combination;
responsive to the predetermined test being met by a first group, the first group being comprised in the plurality of groups of pixels, using at least one component in a tuple of a first color pixel in the color image to determine for a first grayscale pixel in the first group, a first new intensity which is to replace a first existing intensity of the first grayscale pixel in the first grayscale image;
responsive to the predetermined test being not met by a second group, the second group being comprised in the plurality of groups of pixels, retaining unchanged a second existing intensity of a second grayscale pixel in the first grayscale image; and
storing in a memory, a second grayscale image formed as a composite, by combination of at least the first new intensity for the first grayscale pixel and the second existing intensity of the second grayscale pixel.

11. The non-transitory computer-readable storage media of claim 10 wherein said at least one component in the tuple is hereinafter a first tuple component, the method further comprising:
in response to the predetermined test being met by a third group, the third group being comprised in the plurality of groups of pixels in the first grayscale image, using a second tuple component in the tuple of a third color pixel in the color image to determine for a third grayscale pixel in the third group, a third new intensity which is to replace a third existing intensity for the third grayscale pixel in the first grayscale image.

12. The non-transitory computer-readable storage media of claim 10 wherein:
the predetermined test comprises comparison of variance in intensities of a group of pixels with a predetermined limit.

13. The non-transitory computer-readable storage media of claim 10 wherein:
the tuple has N color channels;
a color channel is automatically selected for having highest contrast among the N color channels; and
an intensity of the color channel that is automatically selected is used in determining the first new intensity.

14. The non-transitory computer-readable storage media of claim 10 wherein:
the checking is performed at least in response to failure to detect after binarization, any word of text in a region that comprises the first group and the second group in the first grayscale image.

15. The non-transitory computer-readable storage media of claim 10 wherein the predetermined test is hereinafter a first test, the method further comprising:
checking whether a second test for presence of a peak is met, in a histogram of intensities of grayscale pixels located in a rectangular block that encloses within the second grayscale image, a location corresponding to the first grayscale pixel in the first grayscale image.

16. The non-transitory computer-readable storage media of claim 15 wherein the rectangular block is hereinafter a first rectangular block, the method further comprising:
when the second test is not met, binarizing the first rectangular block in the second grayscale image, based on a threshold identified by use of the histogram of intensities of grayscale pixels; and
when the second test is met, retaining unchanged a second rectangular block in the first grayscale image corresponding to the first rectangular block in the second grayscale image.

17. The non-transitory computer-readable storage media of claim 15 wherein:
the second test is checked at least when confidence of decoding of a word in the rectangular block is not above a limit.

18. A mobile device comprising:
a camera;
a memory operatively connected to the camera to receive at least an image therefrom;
a processor operatively connected to the memory to execute a plurality of instructions stored in the memory, configured to:
supply a color image of a scene of real world captured by the camera and a first grayscale image generated from the color image;
check whether a plurality of groups of pixels meet a predetermined test for low contrast;
wherein the predetermined test is performed on color pixels in the color image or on grayscale pixels in the first grayscale image or on any characteristics thereof in combination;
responsive to the predetermined test being met by a first group, the first group being comprised in the plurality of groups of pixels, use at least one component in a tuple of a first color pixel in the color image to determine for a first grayscale pixel in the first group, a first new intensity which is to replace a first existing intensity of the first grayscale pixel in the first grayscale image;
responsive to the predetermined test being not met by a second group, the second group being comprised in the plurality of groups of pixels, retaining unchanged a second existing intensity of a second grayscale pixel in the first grayscale image; and
store in the memory, formed as a composite, by combination of at least the first new intensity for the first grayscale pixel and the second existing intensity of the second grayscale pixel.

19. The mobile device of claim 18 wherein:
said at least one component in the tuple is hereinafter a first tuple component; and the processor is further configured to be responsive to the predetermined test being met by a third group, the third group being comprised in the plurality of groups of pixels in the first grayscale image, to use a second tuple component in the tuple of a third color pixel in the color image to determine for a third grayscale pixel in the third group, a third new intensity which is to replace a third existing intensity for the third grayscale pixel in the first grayscale image.

20. The mobile device of claim 18 wherein:

the predetermined test comprises comparison of variance in intensities of a group of pixels with a predetermined limit.

21. The mobile device of claim 18 wherein:

the tuple has N color channels;

a color channel is automatically selected for having highest contrast among the N color channels; and an intensity of the color channel that is automatically selected is used in determining the first new intensity.

22. An apparatus for identifying regions of text, the apparatus comprising:

a processor;

a memory coupled to the processor, the memory storing a color image of a scene of real world captured by a camera of a mobile device, and a first grayscale image generated from the color image;

means for checking whether a plurality of groups of pixels meet a predetermined test for low contrast;

wherein the predetermined test is performed on color pixels in the color image or on grayscale pixels in the first grayscale image or on any characteristics thereof in combination;

means, responsive to the predetermined test being met by a first group, the first group being comprised in the plurality of groups of pixels, for using at least one component in a tuple of a first color pixel in the color image to determine for a first grayscale pixel in the first group, a first new intensity which is to replace a first existing intensity of the first grayscale pixel in the first grayscale image;

means, responsive to the predetermined test being not met by a second group, the second group being comprised in the plurality of groups of pixels, for retaining unchanged a second existing intensity of a second grayscale pixel in the first grayscale image;

means for storing in the memory, a second grayscale image formed as a composite, by combination of at least the first new intensity for the first grayscale pixel and a second existing intensity of a second grayscale pixel.

23. The apparatus of claim 22 wherein:

the predetermined test comprises comparison of variance in intensities of a group of pixels with a predetermined limit.

24. The apparatus of claim 22 wherein:

the tuple has N color channels;

a color channel is automatically selected for having highest contrast among the N color channels; and an intensity of the color channel that is automatically selected is used in determining the first new intensity.

* * * * *